(12) United States Patent
Kambe et al.

(10) Patent No.: US 11,580,679 B2
(45) Date of Patent: Feb. 14, 2023

(54) INFORMATION PROCESSING APPARATUS, INFORMATION PROCESSING METHOD, AND NON-TRANSITORY COMPUTER READABLE MEDIUM

(71) Applicant: YOKOGAWA ELECTRIC CORPORATION, Musashino (JP)

(72) Inventors: Takahiro Kambe, Musashino (JP); Tatenobu Seki, Musashino (JP); Nobuaki Ema, Musashino (JP); Masato Annen, Musashino (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 7 days.

(21) Appl. No.: 17/134,171

(22) Filed: Dec. 25, 2020

(65) Prior Publication Data

US 2021/0279922 A1 Sep. 9, 2021

(30) Foreign Application Priority Data

Mar. 6, 2020 (JP) .............................. JP2020-039174

(51) Int. Cl.
| | | |
|---|---|---|
| G09G 5/00 | (2006.01) | |
| G06T 11/20 | (2006.01) | |
| G06T 7/00 | (2017.01) | |
| G06T 11/60 | (2006.01) | |
| G06V 10/22 | (2022.01) | |

(52) U.S. Cl.
CPC .......... *G06T 11/203* (2013.01); *G06T 7/0008* (2013.01); *G06T 11/60* (2013.01); *G06V 10/22* (2022.01); *G06T 2207/30108* (2013.01)

(58) Field of Classification Search
CPC ....... G06T 19/006; G06T 19/00; G06F 3/011; G06F 3/012; G02B 27/017
USPC .......................................................... 345/619
See application file for complete search history.

(56) References Cited

U.S. PATENT DOCUMENTS

| | | | |
|---|---|---|---|
| 2013/0191106 A1* | 7/2013 | Kephart ........... | G05B 19/41885 703/21 |
| 2019/0236352 A1* | 8/2019 | Duke .................... | G06V 30/413 |
| 2019/0340306 A1* | 11/2019 | Harrison ............... | G06T 15/506 |
| 2021/0096543 A1* | 4/2021 | Stump .................... | G06Q 10/06 |

FOREIGN PATENT DOCUMENTS

| | | |
|---|---|---|
| EP | 3176711 A1 | 6/2017 |
| JP | 6228681 B2 | 11/2017 |
| WO | 2019131999 A1 | 7/2019 |

* cited by examiner

*Primary Examiner* — Gordon G Liu
(74) *Attorney, Agent, or Firm* — Kenja IP Law PC

(57) ABSTRACT

An information processing apparatus (10) is for supporting work by a user who uses drawings for a plant. The information processing apparatus (10) includes a controller (15). The controller (15) is configured to convert a drawing including elements configuring the plant into an abstract model represented by element information indicating the elements and connection information indicating a connection relationship between the elements. The controller (15) is configured to generate display information, when it is judged that a difference exists between one abstract model based on one drawing and another abstract model based on another drawing, for displaying the differing portion in a different form than another portion.

15 Claims, 19 Drawing Sheets

[Pre-change]

[Post-change]

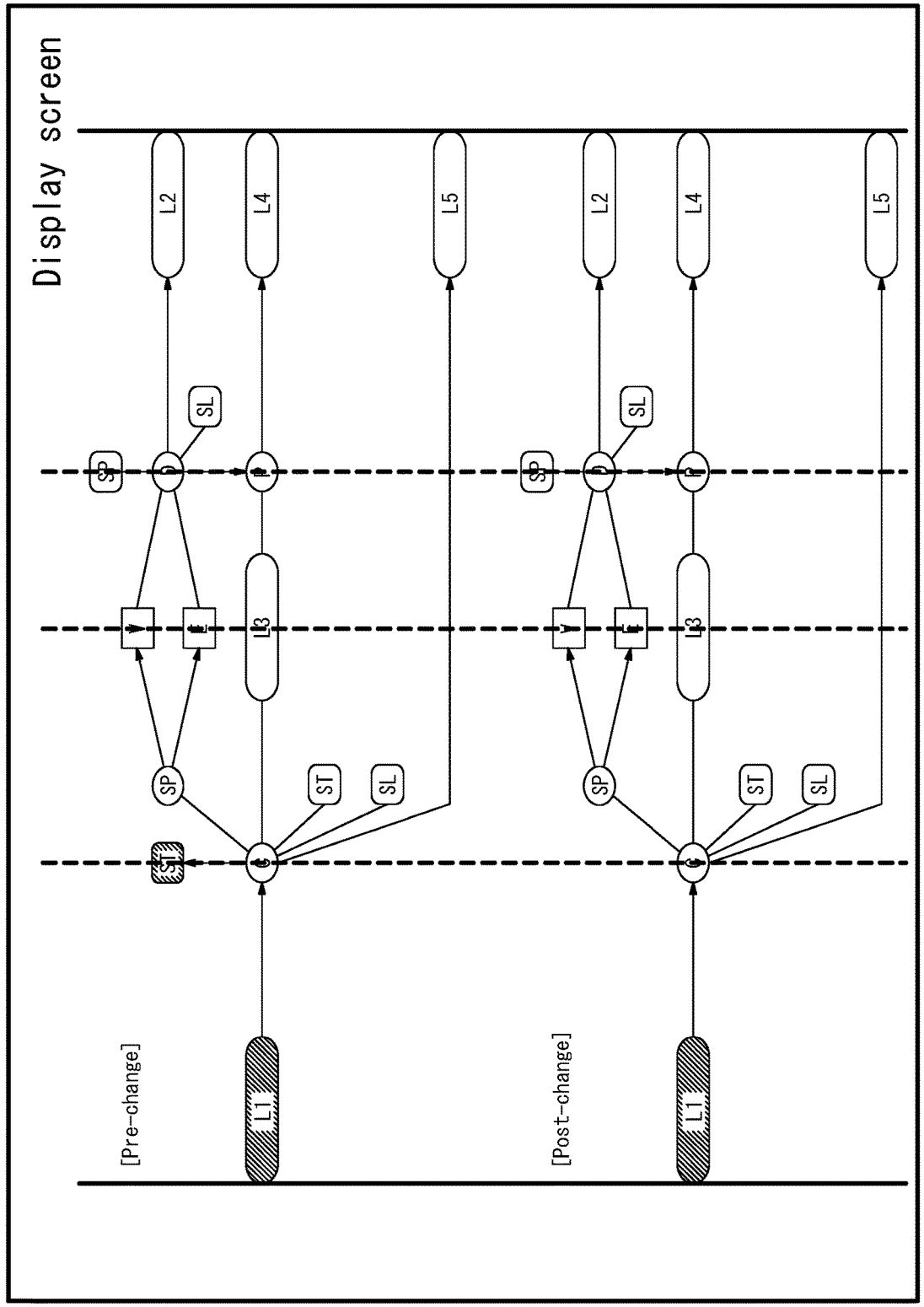

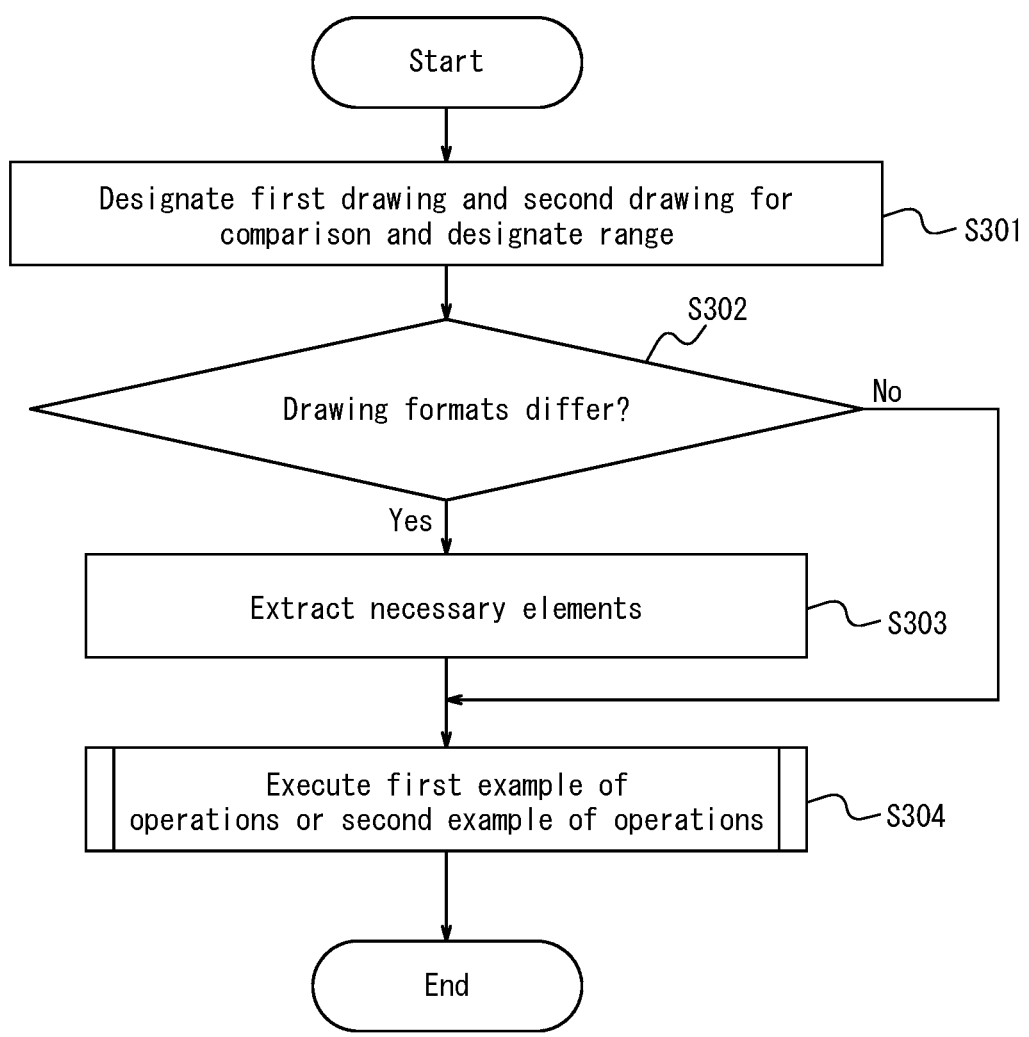

US 11,580,679 B2

INFORMATION PROCESSING APPARATUS, INFORMATION PROCESSING METHOD, AND NON-TRANSITORY COMPUTER READABLE MEDIUM

CROSS-REFERENCE TO RELATED APPLICATION

The present application claims priority to Japanese Patent Application No. 2020-039174 filed Mar. 6, 2020, the entire contents of which are incorporated herein by reference.

TECHNICAL FIELD

The present disclosure relates to an information processing apparatus, an information processing method, and a non-transitory computer readable medium.

BACKGROUND

For construction and maintenance of plants, for example, users have needed to handle a large volume of drawings for the same equipment. Technology has been developed for supporting operations by a user who uses such drawings for a plant.

For example, patent literature (PTL) 1 discloses a plant design support apparatus and a plant design support program that enable efficient discovery of missing design information, copying errors, and the like at the time of plant design.

CITATION LIST

Patent Literature

PTL 1: JP 6228681 B2

SUMMARY

An information processing apparatus according to an embodiment is for supporting work by a user who uses drawings for a plant. The information processing apparatus includes a controller configured to convert a drawing including elements configuring the plant into an abstract model represented by element information indicating the elements and connection information indicating a connection relationship between the elements, and generate display information, when it is judged that a difference exists between one abstract model based on one drawing and another abstract model based on another drawing, for displaying a differing portion in a different form than another portion.

BRIEF DESCRIPTION OF THE DRAWINGS

In the accompanying drawings:

FIG. 9C is a schematic diagram in which the second abstract models of FIG. 9A and FIG. 9B are arrayed vertically;

FIG. 12 is a flowchart based on a third example of operations.

DETAILED DESCRIPTION

Figure 1:
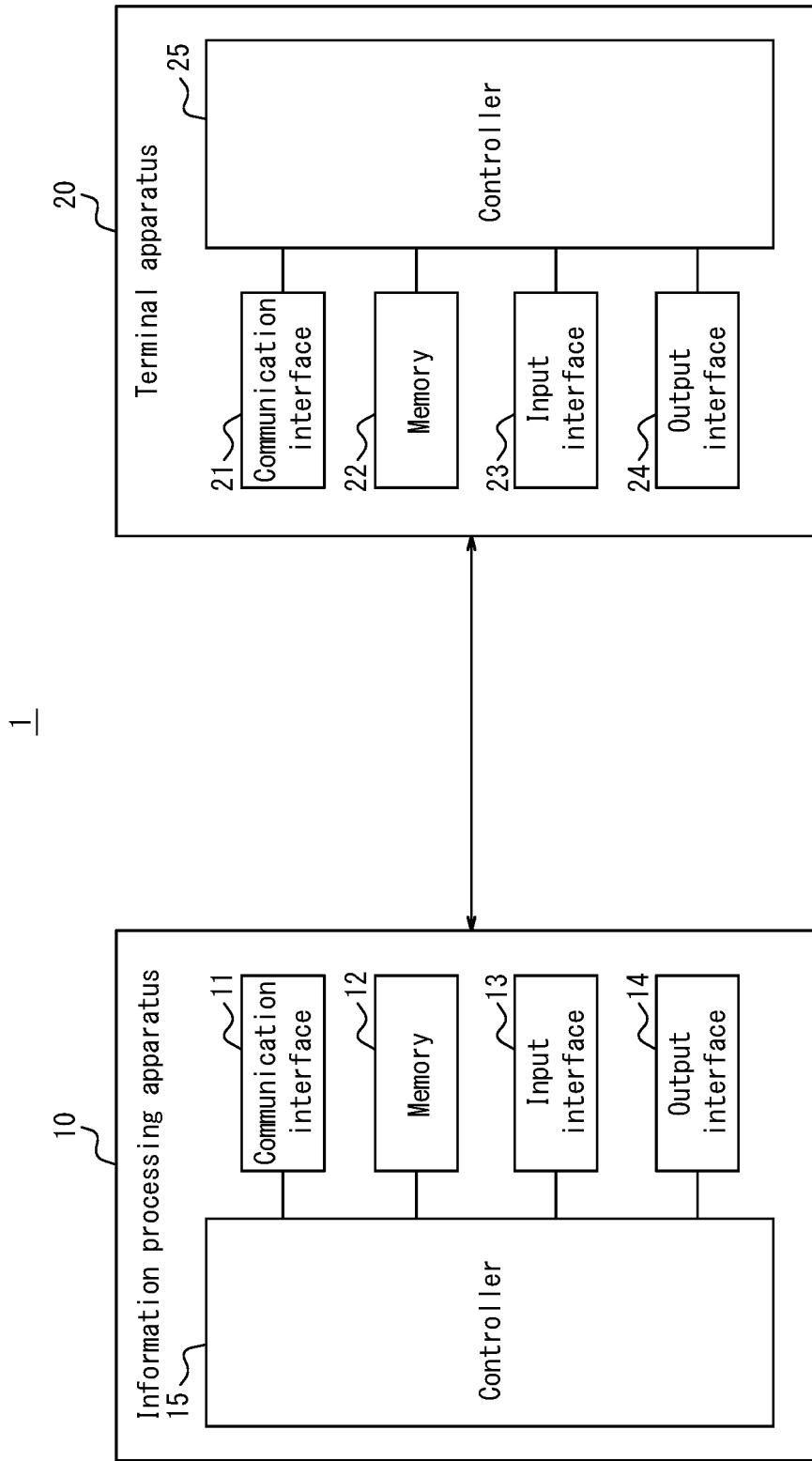
FIG. 1 is a block diagram illustrating the schematic configuration of an information processing system that includes an information processing apparatus according to an embodiment of the present disclosure.

Plant equipment is generally large scale, and many operations from many perspectives are necessary. For example, during various types of design, construction/remodeling, and maintenance of a plant, the amount of work by a user who handles a large amount of drawings for the same equipment is enormous. Accordingly, demand exists for increased work efficiency when checking for differences between drawings after the creation of such a large amount of drawings, for example.

It would be helpful to provide an information processing apparatus, an information processing method, and a non-transitory computer readable medium that improve work efficiency by a user who uses drawings for a plant.

An information processing apparatus according to an embodiment is for supporting work by a user who uses drawings for a plant. The information processing apparatus includes a controller configured to convert a drawing including elements configuring the plant into an abstract model represented by element information indicating the elements and connection information indicating a connection relationship between the elements, and generate display information, when it is judged that a difference exists between one abstract model based on one drawing and another abstract model based on another drawing, for displaying a differing portion in a different form than another portion. The efficiency of work by a user who uses drawings for a plant thereby improves. The user can compare the content of a plurality of drawings visually and confirm the differing portion and the like quickly and accurately in the abstract model displayed as display information.

In the information processing apparatus according to an embodiment, the abstract model may include a first abstract model for processing by the controller and a second abstract model, yielded by conversion of the first abstract model, for display to the user, and the controller may be configured to convert elements arranged in series among the elements included in the drawing into element information arranged in series in the first abstract model and in the second abstract model. This facilitates a comparison of elements (series chain) connected in series between a plurality of drawings for comparison and facilitates confirmation of the comparison results (visual confirmation by the user). Since the display of the second abstract model based on a series chain is extremely concise, the user can easily confirm changes. Consequently, work efficiency increases, and omissions and mistakes in confirmation by the user are reduced. The work by a user who handles a large volume of drawings for the same equipment can thereby be performed accurately in a short time, and the occurrence of work errors and fatal defects in the plant can be suppressed during design, construction, and maintenance of a large-scale plant. The first abstract model for processing and the second abstract model for display may be the same format or different formats. When a first abstract model exclusively for processing is provided, it does not matter whether the model is displayable.

In the information processing apparatus of an embodiment, the controller may be configured to arrange pieces of the element information determined to be identical between one first abstract model and another first abstract model so that positions of the pieces of the element information in an array direction are identical in the second abstract model. The element information is thereby arrayed in a more organized manner. Consequently, the second abstract model is more visible for the user.

In the information processing apparatus of an embodiment, the controller may be configured to arrange pieces of the element information determined to be identical between the one first abstract model and the another first abstract model so that the pieces of the element information are facing along one grid line among a plurality of grid lines separated in the array direction at predetermined intervals in the second abstract model. The user can thereby see at a glance which pieces of element information are identical. The efficiency and accuracy of work by the user therefore improve.

In the information processing apparatus of an embodiment, when corresponding element information is missing in one of the one first abstract model and the another first abstract model, the controller may be configured to display one second abstract model and another second abstract model in a state without the facing element information. The user can thereby easily extract the differing portion between one second abstract model and another second abstract model.

In the information processing apparatus of an embodiment, the controller may be configured to convert elements arranged in parallel among the elements included in the drawing into element information arranged in parallel in the first abstract model and in the second abstract model. This facilitates a comparison of groups of elements arranged in parallel between a plurality of drawings for comparison and facilitates confirmation of the comparison results. Since the display of the second abstract model based on such groups of elements is concise, the user can easily confirm changes. Consequently, work efficiency increases, and omissions and mistakes in confirmation by the user are reduced. The work by a user who handles a large volume of drawings for the same equipment can thereby be performed accurately in a short time, and the occurrence of work errors and fatal defects in the plant can be suppressed during design, construction, and maintenance of a large-scale plant.

In the information processing apparatus of an embodiment, the controller may be configured to arrange pieces of the element information determined to be identical between the one first abstract model and the another first abstract model so that an arrangement relationship is identical in each second abstract model, and positions of the pieces of the element information in one direction are identical in the second abstract model. The user can thereby see at a glance which pieces of element information are identical. The efficiency and accuracy of work by the user therefore improve.

In the information processing apparatus of an embodiment, when the connection information associated with certain element information in one first abstract model is different from the connection information associated with element information determined to be identical to the certain element information in another first abstract model, the controller may be configured to display one second abstract model and another second abstract model in a state such that the connection information differs. Such display enables the user to recognize easily that the connection information differs between one second abstract model and another second abstract model. For example, to compare second abstract models, it suffices for the user to focus on the change in the number of branches of each branch node, the change in the number of lines and end nodes, and the like. Omissions and the like by the user are therefore reduced, while efficiency and accuracy of work by the user improve.

In the information processing apparatus of an embodiment, the element information may include identification information for identifying the elements and attribute information of the elements, and the controller may be configured to determine that pieces of the element information are identical between one first abstract model and another first abstract model based on at least one of the identification information and the attribute information. The information processing apparatus can thereby easily identify identical pieces of element information. By the controller determining that pieces of element information are identical based on the attribute information in addition to or instead of the identification information, the information processing apparatus can identify identical pieces of element information more accurately even when it cannot be determined whether pieces of element information are identical based only on the identification information.

In the information processing apparatus of an embodiment, the display information may include highlight information for highlighting the differing portion based on at least one of a display color, a display format, a display line type, an additional display symbol, and an additional display character. The user can thereby compare the content of a plurality of drawings visually and confirm the differing portion and the like quickly and accurately in the second abstract model displayed together with the highlight information. The efficiency and accuracy of work by the user therefore improve.

An information processing method according to an embodiment is for execution by an information processing apparatus that supports work by a user who uses drawings for a plant. The information processing method includes converting a drawing including elements configuring the plant into an abstract model represented by element information indicating the elements and connection information indicating a connection relationship between the elements, judging whether a difference exists between one abstract model based on one drawing and another abstract model based on another drawing, and generating display information, when it is judged that the difference exists between the one abstract model and the another abstract model, for displaying a differing portion in a different form than another portion. The efficiency of work by a user who uses drawings for a plant thereby improves. The user can compare the content of a plurality of drawings visually and confirm the differing portion and the like quickly and accurately in the abstract model displayed as display information.

A program according to an embodiment is for causing an information processing apparatus that supports work by a user who uses drawings for a plant to execute processing including converting a drawing including elements configuring the plant into an abstract model represented by element information indicating the elements and connection information indicating a connection relationship between the elements, judging whether a difference exists between one abstract model based on one drawing and another abstract model based on another drawing, and generating display information, when it is judged that the difference exists between the one abstract model and the another abstract model, for displaying a differing portion in a different form than another portion. The efficiency of work by a user who uses drawings for a plant thereby improves. The user can compare the content of a plurality of drawings visually and confirm the differing portion and the like quickly and accurately in the abstract model displayed as display information.

According to the present disclosure, an information processing apparatus, an information processing method, and a non-transitory computer readable medium that improve work efficiency by a user who uses drawings for a plant can be provided.

(Outline)

First, the outline of an information processing apparatus according to an embodiment of the present disclosure is described.

The information processing apparatus according to an embodiment of the present disclosure supports work, such as design, by a user who uses drawings for a plant. In greater detail, the information processing apparatus according to an embodiment of the present disclosure facilitates identification or the like of changed portions of drawings used for construction, refurbishment, or maintenance of a plant, for example.

In addition to an industrial plant such as a chemical plant, examples of the "plant" in the present disclosure include a plant for managing a well site, such as a gas field or oil field, and the surrounding area. Additional examples of the plant may include a plant for managing power generation such as water power, thermal power, nuclear power, or the like; a plant for managing environmental power generation such as solar power, wind power, or the like; and a plant for managing water and sewage, a dam, or the like.

The equipment in such plants is large-scale, and the perspective and approach the user takes during work differ for each element configuring the plant, which includes main instruments, valves, pipes, and the like. Accordingly, multiple organizations or individuals participate and share the work required to create drawings, revise drawings, and the like. At this time, drawings that are for the same equipment and are used in construction, refurbishment, and maintenance of a plant, for example, come in many formats in accordance with application. In the present disclosure, the "drawing formats" include, for example, a process flow diagram (PFD), a piping and instrumentation diagram (P&ID), and a 3D piping diagram.

For a user who acts as a worker in design, renovation, or the like of a plant, the amount of work is enormous, and greater efficiency and a reduction in costs are desired. Drawings that have already been created are therefore generally reused. At this time, it may be the case that the content of a change to the same portion of the same equipment has been reflected in one drawing but not reflected in another drawing. Among a plurality of drawings, different employees in charge may create the same type of drawing (such as P&IDs), and the creation time may differ. Between different types of drawings, corrections made by an employee in charge of a PFD may not have been reflected in a P&ID. Such inconsistency between a plurality of drawings for the same equipment is preferably discovered and resolved early.

For example, PTL 1 addresses the need for careful confirmation when aggregating design information into a P&ID and discloses technology for suppressing the occurrence of design errors. The plant design support apparatus and the plant design support program disclosed in PTL 1 use a predetermined color to identify and display a control unit that satisfies a designated pickup condition in one drawing. Even if such locations are identified, however, the workload for the user to compare a plurality of drawings visually is extremely large. The work efficiency of users who use drawings for a plant therefore also decreases.

Additionally, when the drawing format differs between drawings being compared, the content, form, and the like of elements (which devices and information are included) configuring the drawings differ between drawings, making a mechanical comparison difficult. Even if the comparison can be made, it is difficult for the user to grasp whether a differing portion between drawings being compared stems from an element only being depicted in one of the drawings due to a difference in drawing format, due to the actual addition or deletion of an element as plant equipment, or due to an element not being depicted properly in one of the drawings for a reason such as human error, for example. The workload on the user for confirming such content of a differing portion is extremely large. Consequently, the work efficiency of users who use drawings for a plant also decreases.

In light of these considerations, it would be helpful to provide an information processing apparatus that improves work efficiency by a user who uses drawings for a plant.

To this end, an information processing apparatus according to an embodiment of the present disclosure converts a complex drawing that includes elements such as equipment and devices configuring a plant to an abstract model represented concisely using element information indicating elements and connection information indicating connection relationships between elements.

The "element information" in the present disclosure includes element graphics, an element type attached to the element graphic and indicating the corresponding element, identification information for distinguishing between elements configuring a plant, and attribute information for the elements, for example. The "identification information" includes a tag number and identification (ID) unique to each device, equipment, or the like, for example. The "attribute information" includes properties and parameters, for example. When the element is a tank, for example, the attribute information includes detailed information such as the type of tank, e.g. closed type, double wall type, or dome type, and parameters such as the material, volume, and upper and lower limits thereof. The "abstract model" in the present disclosure includes a first abstract model for processing by the controller 15, described below, and a second abstract model, yielded by conversion of the first abstract model, for display to the user, for example. The abstract model may, for example, be represented in tabular format such as Excel or by markup language, including Hyper Text Markup Language (HTML) and Extensible Markup Language (XML). The first abstract model and the second abstract model may be the same format or different formats. In the case of the same format, one conversion is sufficient. If the original drawings can be compared, and the comparison result can be displayed as a highly visible abstract model, then various comparison methods, including image comparison, may be used.

When it is judged that a difference exists between one abstract model based on one drawing and another abstract model based on another drawing, the information processing apparatus according to an embodiment of the present disclosure generates display information for displaying a differing portion in a different form than another portion that matches with no difference (simply referred to below as "another portion"). In the present application, the "display information" further includes highlight information for highlighting the differing portion based on at least one of a display color, a display format, a display line type, an additional display symbol, and an additional display character, for example. In the case of the display color, for example, the highlight information includes a first display color of element information in the other portion and a second display color, different from the first display color, of element information in the differing portion.

When it is judged that the format differs between a first drawing and a second drawing that include an element configuring a plant, the information processing apparatus according to an embodiment of the present disclosure generates an intermediate model, for at least one of the first drawing and the second drawing, such that the format of the first drawing and the format of the second drawing are matched. The information processing apparatus judges whether a difference exists between the first drawing and the second drawing based on the generated intermediate model. In the present disclosure, the "intermediate model" may, for example, include one form of abstract model. For example, when elements are extracted from the drawings, the intermediate model is generated by each of the drawings for comparison being converted to the first abstract model after unnecessary elements are removed. This example is not limiting, and when elements are extracted from the drawings, the intermediate model may be generated by each of the drawings for comparison being converted directly to the second abstract model after unnecessary elements are removed.

The configuration and operations of the information processing apparatus according to an embodiment of the present disclosure are mainly described below with reference to the drawings.

(Configuration)

FIG. 1 is a block diagram illustrating the schematic configuration of an information processing system 1 that includes an information processing apparatus 10 according to an embodiment of the present disclosure. The configuration of the information processing system 1 including the information processing apparatus 10 according to an embodiment of the present disclosure is mainly described with reference to FIG. 1. In addition to the information processing apparatus 10, the information processing system 1 includes a terminal apparatus 20. The information processing apparatus 10 and the terminal apparatus 20 are connected to each other communicably by any appropriate communication technology. To simplify the explanation in FIG. 1, only one of each of the information processing apparatus 10 and the terminal apparatus 20 are depicted. Two or more of each of the information processing apparatus 10 and the terminal apparatus 20 may, however, be included in the information processing system 1.

The information processing apparatus 10 is for supporting work by a user who uses drawings for a plant. For example, the information processing apparatus 10 manages a large volume of drawings for the entire plant. The information processing apparatus 10 is one server apparatus or a plurality of communicably connected server apparatuses. The information processing apparatus 10 is not limited to these examples and may be any general-purpose electronic device, such as a personal computer (PC), or another electronic device dedicated to the information processing system 1.

The terminal apparatus 20 is a general-purpose electronic device such as a PC or a smartphone. The terminal apparatus 20 is, for example, a terminal apparatus used by a user who acts as a worker in designing or maintaining a plant. For example, the terminal apparatus 20 is a supervisor terminal for a user in charge of a specific type of drawing or the like. The terminal apparatus 20 is not limited to these examples and may be an electronic device dedicated to the information processing system 1.

As illustrated in FIG. 1, the information processing apparatus 10 includes a communication interface 11, a memory 12, an input interface 13, an output interface 14, and a controller 15.

The communication interface 11 includes any appropriate communication module capable of connecting and communicating with the terminal apparatus 20 by any appropriate communication technology. The communication interface 11 may further include a communication control module for controlling communication with the terminal apparatus 20 and a storage module for storing communication data, such as identification information, necessary for communicating with the terminal apparatus 20. In an embodiment, the information processing apparatus 10 is connected communicably to the terminal apparatus 20 via the communication interface 11.

The memory 12 includes any storage module, such as a hard disk drive (HDD), a solid state drive (SSD), an electrically erasable programmable read-only memory (EE-PROM), a read-only memory (ROM), and a random access memory (RAM). The memory 12 may, for example, function as a main storage apparatus, an auxiliary storage apparatus, or a cache memory. The memory 12 stores any information used in operations of the information processing apparatus 10. For example, the memory 12 may store system programs, application programs, various information received by the communication interface 11, and the like. The memory 12 is not limited to being internal to the information processing apparatus 10 and may be an external database or an external storage module connected through a digital input/output port or the like, such as a universal serial bus (USB).

For example, the memory 12 stores various data for drawings including elements configuring a plant based on the above-described drawing format. The memory 12 stores a plurality of sets of data for a first abstract model, yielded by abstraction of drawings including elements configuring a plant, used in processing by the controller 15 and a second abstract model for display on at least one of the information processing apparatus 10 and the terminal apparatus 20, for example. The memory 12 stores a plurality of sets of data for an intermediate model, for example, that matches the format of a first drawing to the format of a second drawing. The memory 12 stores information on drawing rules, described below, determined for each of the above-described drawing formats, for example. The "drawing rules" in the present disclosure include an element table, for example, associating the plant elements to be listed in each drawing with the corresponding drawing format.

Additionally, the memory 12 may store history information and involved party information, for example. The "history information" in the present disclosure includes, for example, the results of a comparison, performed by the controller 15, between a plurality of drawings, the background of drawing registration on the information processing apparatus 10, a history of notification to involved parties, and a history of content designated by the user using the input interface 13. The "involved party information" in the present disclosure includes, for example, identification information for the terminal apparatus 20, the email addresses of users as parties involved with design or maintenance of the plant, work responsibilities of users, and the like as destination information at the time of presenting the comparison results for drawings, requesting confirmation, and the like.

The input interface 13 includes one or more input interfaces that receive a user input operation and acquire input information based on the user operation. The input interface 13 may, for example, be a physical key, a capacitance key, a touchscreen provided integrally with the display of the output interface 14, a microphone that receives audio input, or the like, but these examples are not limiting.

The output interface 14 includes one or more output interfaces that output information to the user to notify the user. For example, the output interface 14 may be a display that outputs information as images, a speaker that outputs information as sound, or the like, but these examples are not limiting. At least one of the input interface 13 and the output interface 14 described above may be formed integrally with the information processing apparatus 10 or be provided separately.

The controller 15 includes one or more processors. The "processor" in an embodiment is a general-purpose processor or a dedicated processor specialized for particular processing, but these examples are not limiting. The controller 15 is communicably connected with each component of the information processing apparatus 10 and controls operations of the information processing apparatus 10 overall.

As illustrated in FIG. 1, the terminal apparatus 20 includes a communication interface 21, a memory 22, an input interface 23, an output interface 24, and a controller 25.

The communication interface 21 includes any appropriate communication module capable of connecting and communicating with the information processing apparatus 10 by any appropriate communication technology. The communication interface 21 may further include a communication control module for controlling communication with the information processing apparatus 10 and a storage module for storing communication data, such as identification information, necessary for communicating with the information processing apparatus 10. In an embodiment, the terminal apparatus 20 is connected communicably to the information processing apparatus 10 via the communication interface 21.

The memory 22 may include any appropriate storage module, such as an HDD, SSD, EEPROM, ROM, or RAM. The memory 22 may, for example, function as a main storage apparatus, an auxiliary storage apparatus, or a cache memory. The memory 22 stores any information used in operations of the terminal apparatus 20. For example, the memory 22 may store system programs, application programs, various information received by the communication interface 21, and the like. The memory 22 is not limited to being internal to the terminal apparatus 20 and may be an external storage module connected through a digital input/output port or the like, such as USB.

The input interface 23 includes one or more input interfaces that receive a user input operation and acquire input information based on the user operation. The input interface 23 may, for example, be a physical key, a capacitance key, a touchscreen provided integrally with the display of the output interface 24, a microphone that receives audio input, or the like, but these examples are not limiting.

The output interface 24 includes one or more output interfaces that output information to the user to notify the user. For example, the output interface 24 may be a display that outputs information as images, a speaker that outputs information as sound, or the like, but these examples are not limiting. At least one of the input interface 23 and the output interface 24 described above may be formed integrally with the terminal apparatus 20 or be provided separately.

The controller 25 includes one or more processors. The controller 25 is communicably connected with each component of the terminal apparatus 20 and controls operations of the terminal apparatus 20 overall.

(Outline of Operations)

Figure 2:
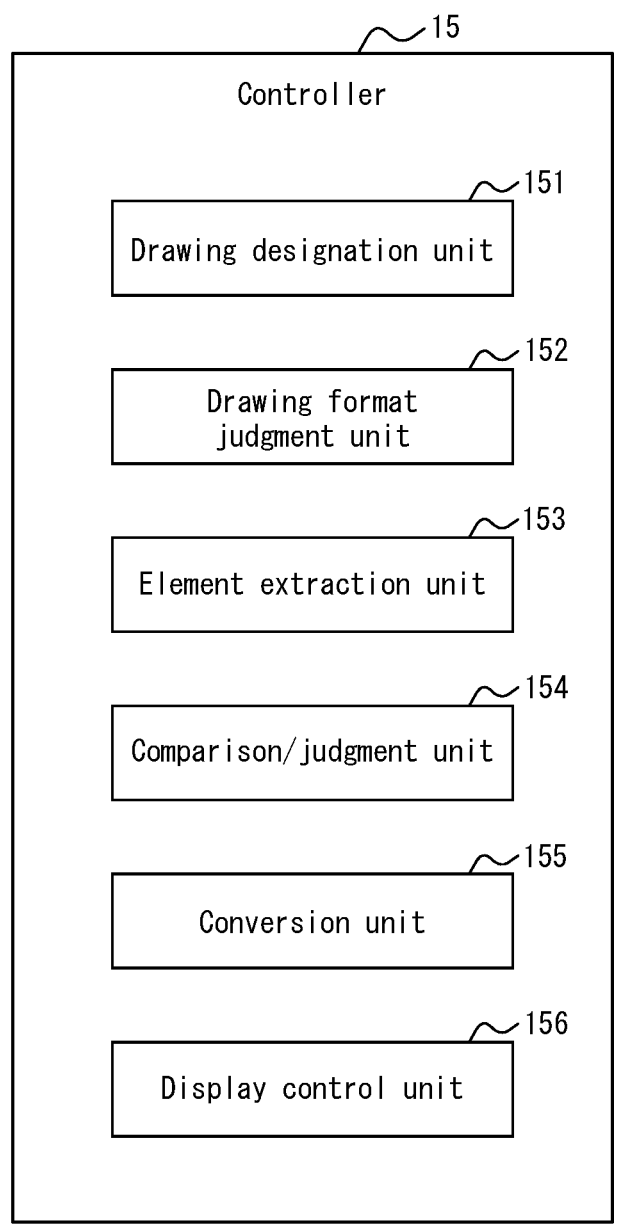
FIG. 2 is a functional block diagram illustrating details of a controller based on functional units to illustrate the functions of a controller of FIG. 1.

FIG. 2 is a functional block diagram illustrating details of a controller 15 based on functional units to illustrate the functions of the controller 15 of FIG. 1. With reference to FIG. 2, an outline of the operations of the information processing system 1 implemented by the functions of the controller 15 is mainly described.

The functions of the controller 15 include a drawing designation unit 151, a drawing format judgment unit 152, an element extraction unit 153, a comparison/judgment unit 154, a conversion unit 155, and a display control unit 156.

The drawing designation unit 151 designates a plurality of drawings for comparison, or a drawing for generating an intermediate model, while referring to the memory 12. The drawing designation unit 151 may further designate a range for comparison in the designated drawings. The drawing designation unit 151 may execute these designation processes automatically or based on input information from the user acquired from at least one of the input interface 13 of the information processing apparatus 10 and the input interface 23 of the terminal apparatus 20.

For a first drawing and a second drawing with different formats, the drawing format judgment unit 152 identifies the format of the first drawing and the second drawing for comparison in order to compare the first drawing and the second drawing based on an intermediate model. The drawing format judgment unit 152 may extract a drawing name from a drawing file name, a drawing name column indicated in the drawing, or the like and identify the format of the drawing based on an extension or the like. The drawing format judgment unit 152 may also contrast elements illustrated in the drawing with the drawing rules, described below, to identify the drawing format. These examples are not limiting. The drawing format judgment unit 152 may identify the drawing format based on input information from the user acquired from at least one of the input interface 13 of the information processing apparatus 10 and the input interface 23 of the terminal apparatus 20.

The element extraction unit 153 extracts the necessary elements from each of a plurality of drawings for comparison designated by the drawing designation unit 151. Based on the first drawing for comparison designated by the drawing designation unit 151, the element extraction unit 153 extracts elements necessary for matching the format of the drawing to the format of the second drawing and extracts elements to remove.

The comparison/judgment unit 154 compares first abstract models generated for a plurality of drawings for comparison. Similarly, when the formats of drawings for comparison differ, the comparison/judgment unit 154 compares the first abstract model (intermediate model) generated for the first drawing for comparison and the first abstract model based on the second drawing for comparison. The comparison/judgment unit 154 judges whether a difference exists based on the result of comparing the first abstract models (one of which is an intermediate model when the drawing formats differ). When a difference is judged to exist, the comparison/judgment unit 154 specifically identifies the locations corresponding to the difference.

The conversion unit 155 converts the necessary elements extracted by the element extraction unit 153 to a first abstract model including element information and connection information. The conversion unit 155 generates an intermediate model as a first abstract model based only on the necessary elements extracted by the element extraction unit 153. The conversion unit 155 converts the first abstract model (intermediate model) to a second abstract model for display on at least one of the output interface 14 of the information processing apparatus 10 and the output interface 24 of the terminal apparatus 20. Conversion is unnecessary when the first abstract model for processing (for comparison) and the second abstract model for display are the same.

To display a plurality of second abstract models on at least one of the output interface 14 of the information processing apparatus 10 and the output interface 24 of the terminal apparatus 20, the display control unit 156 executes adjustment and editing processes, such as matching the display positions of matching element information (elements that are the same between drawings) included in a plurality of second abstract models, generating display information for displaying the differing portion in a different form than other portions, and the like. The display control unit 156 may execute these display adjustment and editing processes as necessary based on input information from the user acquired from at least one of the input interface 13 of the information processing apparatus 10 and the input interface 23 of the terminal apparatus 20.

(First Example of Operations)

Figure 3A:
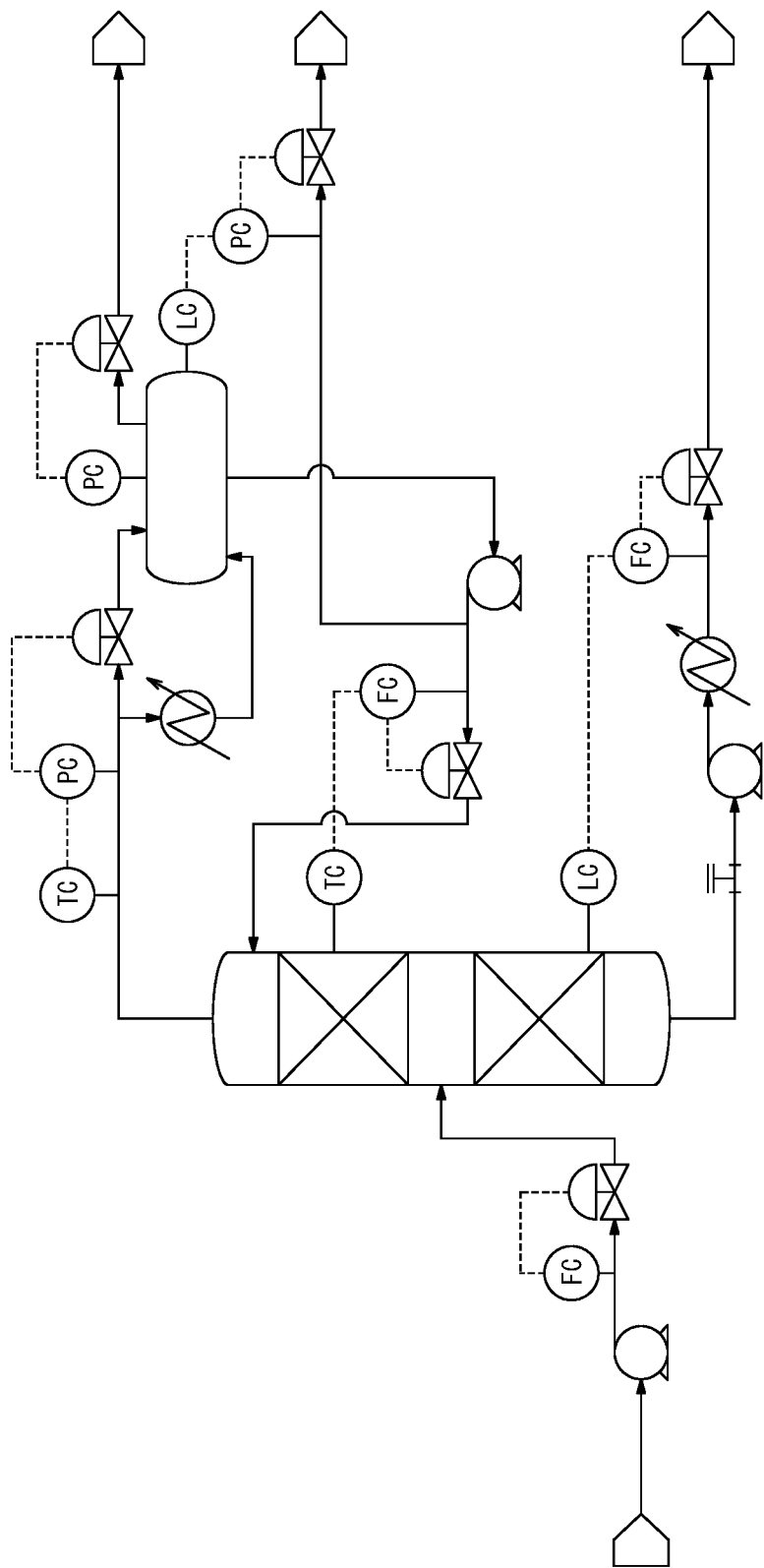
FIG. 3A is a schematic diagram illustrating an example of a pre-change drawing that includes elements configuring a plant.
Figure 3B:
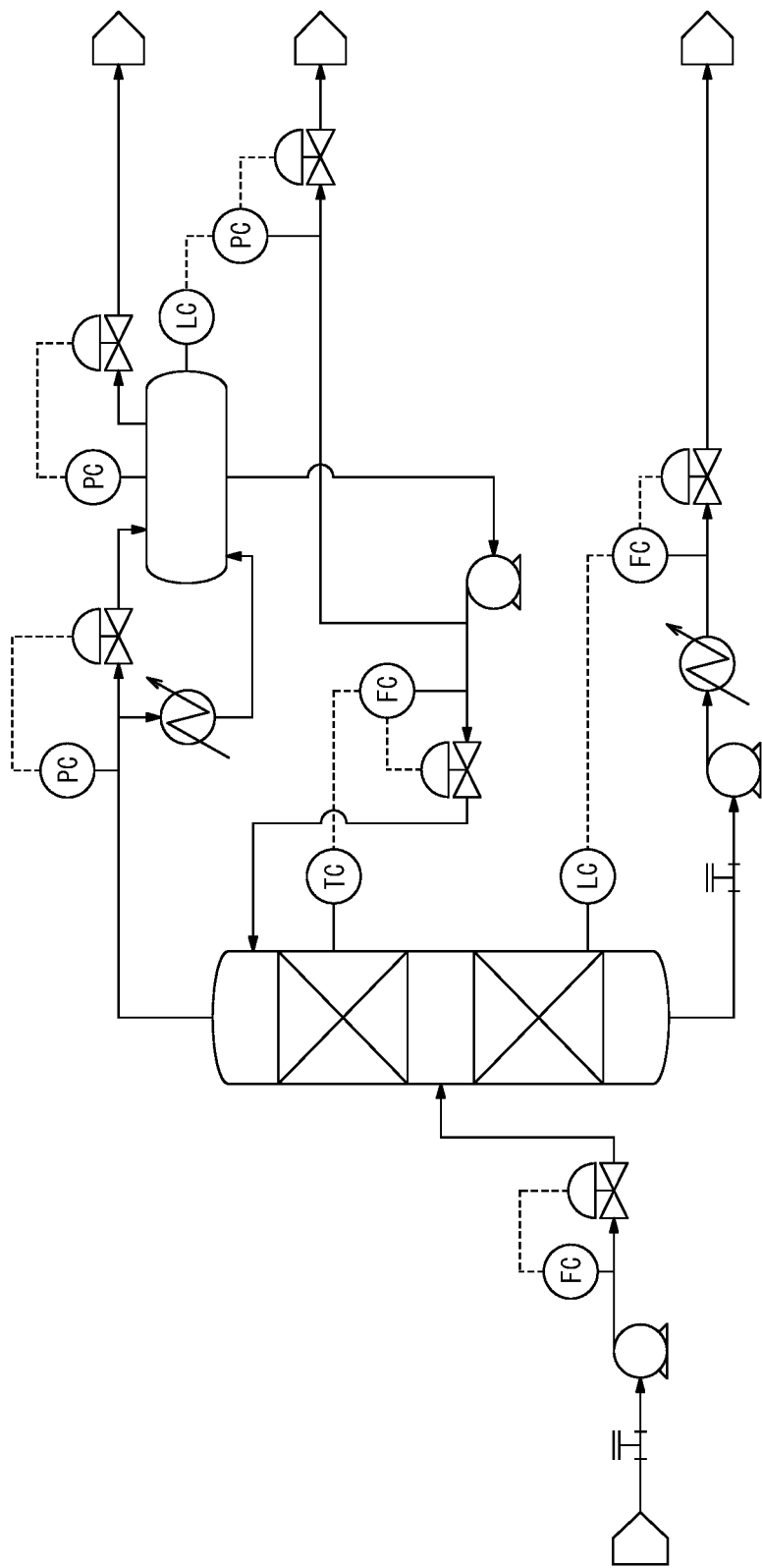
FIG. 3B is a schematic diagram illustrating an example of a post-change drawing that includes elements configuring a plant.

A first example of operations of the information processing system 1 implemented by the functions of the controller 15 is mainly described below. FIG. 3A is a schematic diagram illustrating an example of a pre-change drawing that includes elements configuring a plant. FIG. 3B is a schematic diagram illustrating an example of a post-change drawing that includes elements configuring a plant. Based on a predetermined drawing format, FIGS. 3A and 3B illustrate the connection relationships between a plurality of elements configuring the plant.

The changes between FIGS. 3A and 3B are the addition of a strainer to the input and the removal of a temperature controller at an overhead portion. Even an experienced user cannot easily discover the differences at a glance by making a direct comparison between such old and new drawings based on drawings that include elements configuring a plant.

Figure 4:
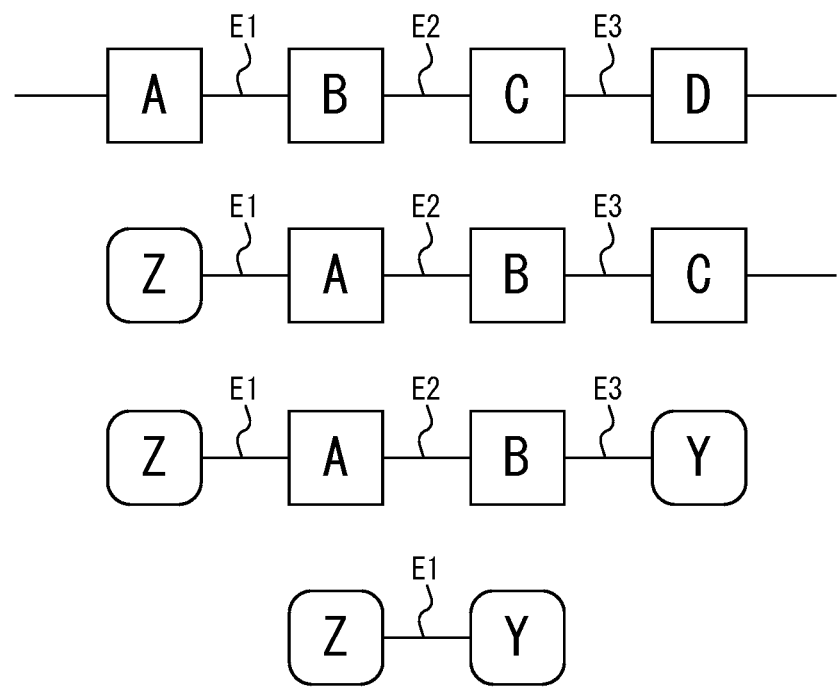
FIG. 4 is a schematic diagram illustrating an example of display of element information and connection information in a second abstract model.

The element extraction unit 153 of the controller 15 therefore extracts elements from the drawings that include elements configuring a plant. The conversion unit 155 of the controller 15 converts the drawings to an abstract model or converts an abstract model to an abstract model of a different format. FIG. 4 is a schematic diagram illustrating an example of display of element information and connection information in a second abstract model. The second abstract model is yielded by extracting elements necessary for comparison from a plurality of drawings with a large amount of information and representing connection relationships between the elements by line segments to represent the elements concisely. The second abstract model has a common format for all drawings to indicate which elements are included in a drawing and the connection relationship by which the elements are connected. Drawings can therefore be compared. The line segments indicate which elements are connected in each drawing, i.e. the order and connection relationships of elements.

As illustrated in FIG. 4, the second abstract model is an abstract representation of a drawing. The elements configuring the plant are, for example, represented by nodes as element information in the second abstract model. A pipe forming part of the plant, for example, is one node. The connection relationships between elements are, for example, represented by edges as connection information.

The nodes are, for example, classified into three types. One type is an end node with only one edge. One type is a terminal pair node with two edges. One type is a branch node, described below in the second example of operations, that has three or more edges.

FIG. 4 illustrates four examples of a second abstract model represented by end nodes and terminal pair nodes. As illustrated in FIG. 4, the display form may change in accordance with the type of node. The end node may, for example, be represented by an element graphic that has a frame with four rounded corners and the element type attached inside. The terminal pair node may, for example, be represented by an element graphic that has a square frame and the element type attached inside.

In the example in the highest tier, four terminal pair nodes A, B, C, D are arranged in series. Node A and node B are connected by edge E1. Node B and node C are connected by edge E2. Node C and node D are connected by edge E3.

In the example in the second tier from the top, one end node Z and three terminal pair nodes A, B, C are arranged in series. Node Z and node A are connected by edge E1.

Node A and node B are connected by edge E2. Node B and node C are connected by edge E3.

In the example in the third tier from the top, two end nodes Z, Y and two terminal pair nodes A, B are arranged in series. Node Z and node A are connected by edge E1. Node A and node B are connected by edge E2. Node B and node Y are connected by edge E3.

In the example in the lowest tier, only two end nodes Z, Y are arranged in series. Node Z and node Y are connected by edge E1.

The comparison/judgment unit 154 of the controller 15 judges whether a difference exists between one first abstract model based on one drawing and another first abstract model based on another drawing. When the comparison/judgment unit 154 of the controller 15 judges that a difference exists between the one first abstract model and the other first abstract model, the display control unit 156 of the controller 15 generates display information for displaying the differing portion in a different form than other portions.

In the first example of operations, the element extraction unit 153 of the controller 15 extracts the portion in which elements are connected in series, i.e. a series chain, from each of the plurality of drawings for comparison. In the present disclosure, a "series chain" includes a group of elements, for example, included in a drawing and arranged in series. The conversion unit 155 of the controller 15 converts a series chain to element information arranged in series in the first abstract model and the second abstract model. The display control unit 156 of the controller 15 arranges pieces of the element information determined to be identical between the one first abstract model and the other first abstract model so that the positions of the pieces of the element information in the array direction are identical in the second abstract model. In other words, the display control unit 156 aligns the positions of the element information in the second abstract model so that the pieces of element information are arranged at matching positions in the array direction. For example, the display control unit 156 arranges series chains indicating the same location in the drawings for comparison so that pieces of element information corresponding to elements indicating the same device or the like in each drawing are aligned and arranged in parallel in the second abstract model. The display of a concise second abstract model generated in this way by matching the positions of corresponding elements facilitates confirmation by the user.

Figure 5:
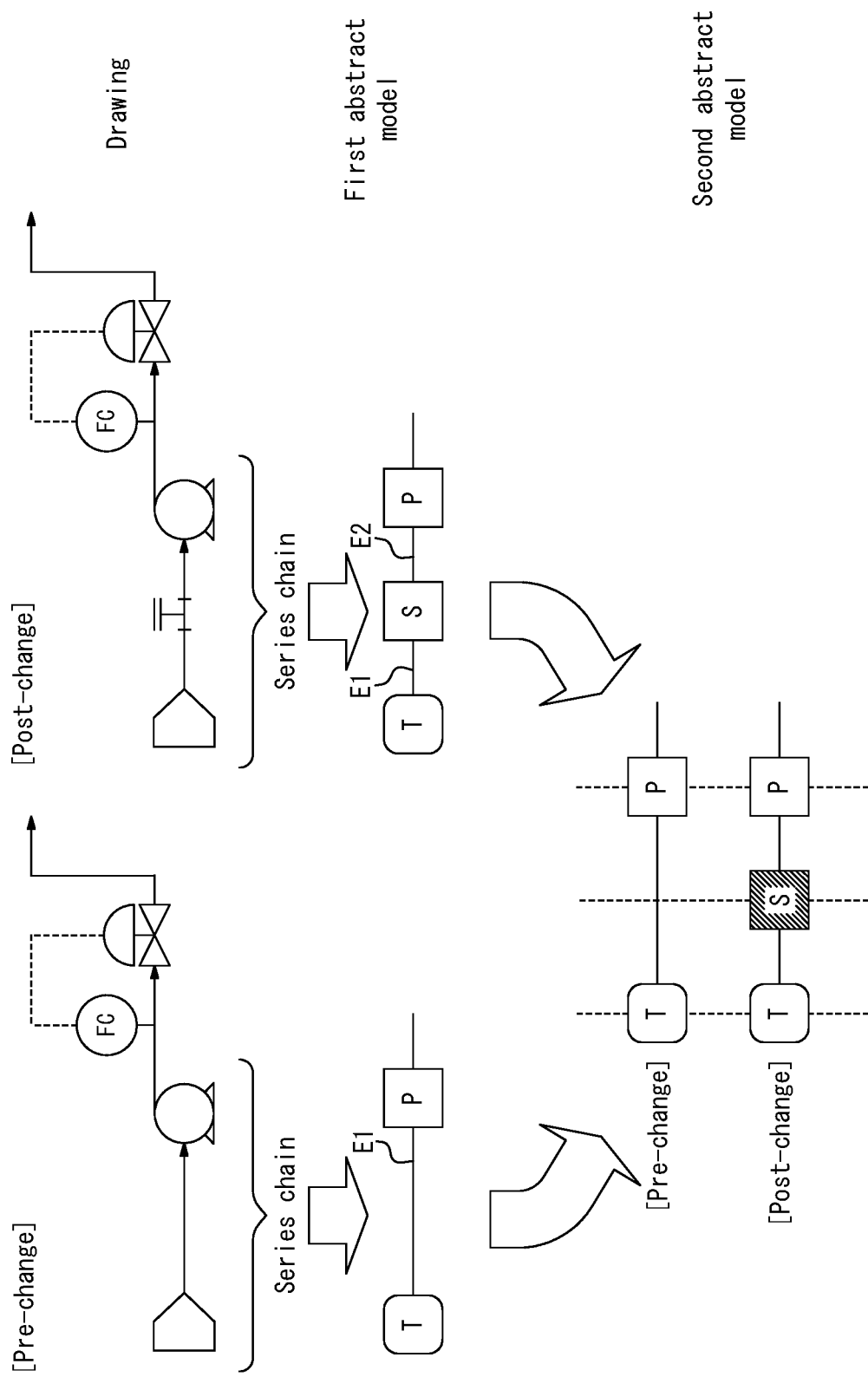
FIG. 5 is a schematic diagram for concretely illustrating a first example of operations.

FIG. 5 is a schematic diagram for concretely illustrating the first example of operations. FIG. 5 illustrates the state in which the display control unit 156 of the controller 15 displays a pre- and post-change comparison of the change to an element in the input portion of FIGS. 3A and 3B. With reference to FIG. 5, the first example of operations is described in greater detail.

For example, at the input portion in FIG. 3A, an input terminal and a pump are connected in series as pre-change elements. The element extraction unit 153 of the controller 15 extracts this portion arranged in series (a series chain including the input terminal and the pump) from FIG. 3A. The conversion unit 155 of the controller 15 converts such an extracted series chain into a first abstract model of a series chain in which an end node T based on the input terminal and a terminal pair node P based on the pump are connected by an edge E1 and represented concisely. The conversion unit 155 of the controller 15 converts the generated first abstract model of the series chain to a second abstract model.

For example, at the input portion in FIG. 3B, an input terminal, a strainer, and a pump are arranged in series as post-change elements. The element extraction unit 153 of the controller 15 extracts this portion arranged in series (a series chain including the input terminal, the strainer, and the pump) from FIG. 3B. The conversion unit 155 of the controller 15 converts such an extracted series chain into a first abstract model of a series chain in which an end node T based on the input terminal, a terminal pair node S based on the strainer, and a terminal pair node P based on the pump are connected by corresponding edges E1, E2. The conversion unit 155 of the controller 15 converts the generated first abstract model of the series chain to a second abstract model.

Based on at least one of identification information and attribute information included in the nodes, the comparison/judgment unit 154 of the controller 15 determines that predetermined element information is identical between the one first abstract model and the other first abstract model. For example, the comparison/judgment unit 154 determines that the end node T in the pre-change first abstract model is identical to the end node T in the post-change first abstract model. For example, the comparison/judgment unit 154 determines that the terminal pair node P in the pre-change first abstract model is identical to the terminal pair node P in the post-change first abstract model.

The display control unit 156 of the controller 15 arranges pieces of the element information determined by the comparison/judgment unit 154 to be identical between the one first abstract model and the other first abstract model so that the pieces of the element information are facing along one grid line among a plurality of grid lines separated in one direction, for example in the array direction of the element information, at predetermined intervals in the second abstract model. For example, the display control unit 156 arranges the end node T in the pre-change first abstract model and the end node T in the post-change first abstract model along the same grid line in the second abstract model. For example, the display control unit 156 arranges the terminal pair node P in the pre-change first abstract model and the terminal pair node P in the post-change first abstract model along the same grid line in the second abstract model.

When corresponding element information is missing in one of the one first abstract model and the other first abstract model, the comparison/judgment unit 154 of the controller 15 judges that a difference exists between the one first abstract model and the other first abstract model. For example, since a node corresponding to the terminal pair node S in the post-change first abstract model is missing in the pre-change first abstract model, the comparison/judgment unit 154 judges that a difference exists between the pre-change first abstract model and the post-change first abstract model. At this time, the display control unit 156 of the controller 15 displays one second abstract model and another second abstract model in a state without the facing element information.

When the comparison/judgment unit 154 judges that the difference exists between the one first abstract model and the other first abstract model, the display control unit 156 of the controller 15 generates display information for displaying the differing portion in a different form than other portions. For example, the display control unit 156 generates highlight information for highlighting the post-change terminal pair node S, which is the differing portion, with a different display color than other portions in the second abstract model. Based on the generated display information, the display control unit 156 causes at least one of the output interface 14 of the information processing apparatus 10 and the output interface 24 of the terminal apparatus 20 to display a comparison between the pre- and post-change second abstract models including the differing portion.

Figure 6:
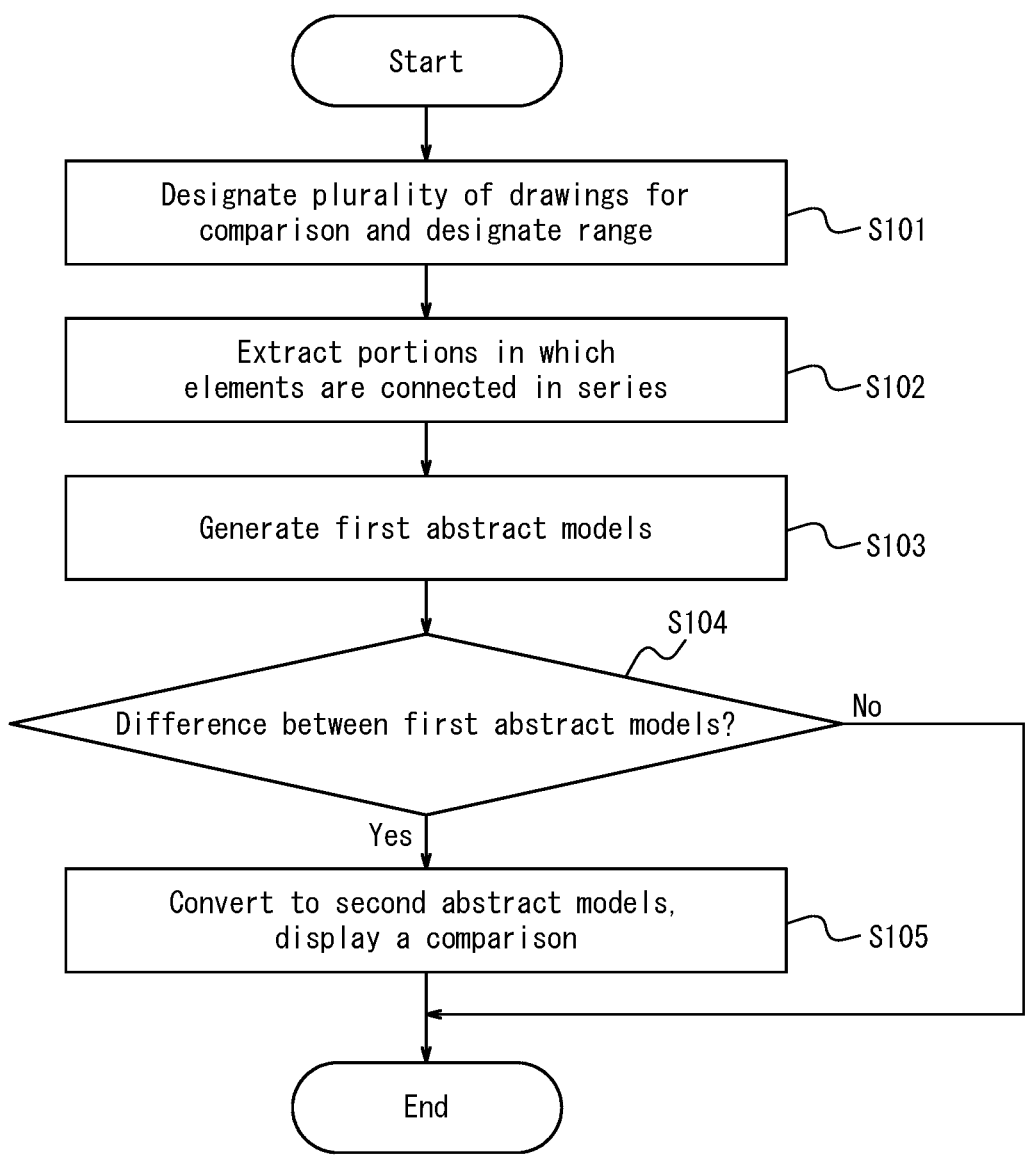
FIG. 6 is a flowchart based on the first example of operations.

FIG. 6 is a flowchart based on the first example of operations. With reference to FIG. 6, an example of operations by the information processing apparatus 10 based on the first example of operations is mainly described.

In step S101, the drawing designation unit 151 of the controller 15 designates a plurality of drawings for comparison. The drawing designation unit 151 may further designate a range for comparison in the designated drawings.

In step S102, the element extraction unit 153 of the controller 15 extracts necessary elements from the drawings designated in step S101, such as the portions where elements are connected in series.

In step S103, the conversion unit 155 of the controller 15 generates first abstract models based on the element groups extracted in step S102.

The processing by the element extraction unit 153 in step S102 and the processing by the conversion unit 155 in step S103 are not limited to the above order. For example, the controller 15 may execute the processing of step S102 after first executing the processing of step S103.

In step S104, the comparison/judgment unit 154 of the controller 15 compares the first abstract models generated in step S103 for the plurality of drawings for comparison and makes judgments such as whether a difference exists between the first abstract models. In greater detail, the comparison/judgment unit 154 judges whether corresponding element information is missing in one first abstract model or in another first abstract model. When it is judged that a difference exists between the first abstract models, the controller 15 executes the processing of step S105. When it is judged that no difference exists between the first abstract models, the controller 15 ends the processing.

When it is judged that a difference exists between the first abstract models in step S104, the conversion unit 155 of the controller 15 converts the first abstract models generated in step S103 to second abstract models in step S105. Similarly, the display control unit 156 of the controller 15 causes at least one of the output interface 14 of the information processing apparatus 10 and the output interface 24 of the terminal apparatus 20 to display a comparison of one second abstract model and another second abstract model including the differing portion. At this time, the display control unit 156 arranges pieces of the element information determined by the comparison/judgment unit 154 to be identical between the one first abstract model and the other first abstract model so that the pieces of element information are on the same grid line in the second abstract model. Additionally, the display control unit 156 generates display information for displaying the differing portion in a different form than other portions.

The display control unit 156 of the controller 15 causes at least one of the output interface 14 of the information processing apparatus 10 and the output interface 24 of the terminal apparatus 20 to display the converted second abstract models while reflecting, as necessary, the display information generated in step S105. In this way, the display control unit 156 displays the second abstract models and encourages confirmation by the user only when a difference exists between the first abstract models for comparison. This example is not limiting. When no difference exists between the first abstract models for comparison, the display control unit 156 may display the second abstract models as they are to convey to the user that the drawings (or portions thereof) match. For example, when no difference exists, the display control unit 156 may provide a display using character information, the second abstract model, and the like to convey that the drawings for comparison match.

Various modifications can be made to the display control executed by the display control unit 156 of the controller 15 in the first example of operations. Such modifications are mainly described below.

In the first example of operations, the end node has been described as being displayed as a frame with four rounded corners and the element type attached inside, and the terminal pair node has been described as being displayed as a square frame with the element type attached inside. However, this example is not limiting. The nodes may be displayed as element graphics with any shape. For example, nodes with directionality may be displayed with shapes including triangles, trapezoids, and the like. The nodes may also be displayed directly by highly visible drawing symbols of elements as in FIGS. 3A and 3B.

In the first example of operations, nodes have been described as being displayed with one character attached as the element type, but this example is not limiting. The nodes may be displayed in a state with at least one of a freely chosen character string, symbol, or element drawing symbol attached in any appropriate form.

In the case of a horizontal series chain, the nodes may be centered in the vertical direction. In the case of a vertical series chain, the nodes may be centered in the horizontal direction. Visibility improves by a series chain being displayed in this way as a concise array of nodes. The nodes may be displayed with the same width or with different widths. For example, the nodes are accurately arranged by the width of all the nodes and the width of all the edges being identical. Display of the grid lines therefore becomes unnecessary.

The intervals between grid lines may be equal or may be matched to the node width or the like, without being equal. The display form of the grid lines may differ between the differing portion, i.e. where a difference exists between nodes, and other portions. For example, the grid lines may be displayed with a difference in at least one of the color, line type, and thickness between the differing portion and the other portions.

The edges have been displayed as lines in the first example of operations, but this example is not limiting. The edges may be displayed using any graphic. The edges may be displayed by arrows to make the direction clear.

In FIG. 5, the input terminal of the drawing is also included in the series chain, but the input terminal may be displayed simply as an end node in the second abstract model, without being included in the series chain.

The display control unit 156 of the controller 15 may display and manage groups of nodes arranged in series based on series chains in a state such that the groups of nodes have line names or the like assigned thereto.

For example, nodes identified as being identical based only on the identification information and arranged on the same grid line may include different attribute information. In this case, the display control unit 156 of the controller 15 may represent that a difference exists in the attribute information by changing at least one of the display color and line type between the nodes.

Together with the display of the second abstract models, the display control unit 156 of the controller 15 may additionally display a confirmation checkmark or the like to indicate whether the user has confirmed the display result.

Figure 7:
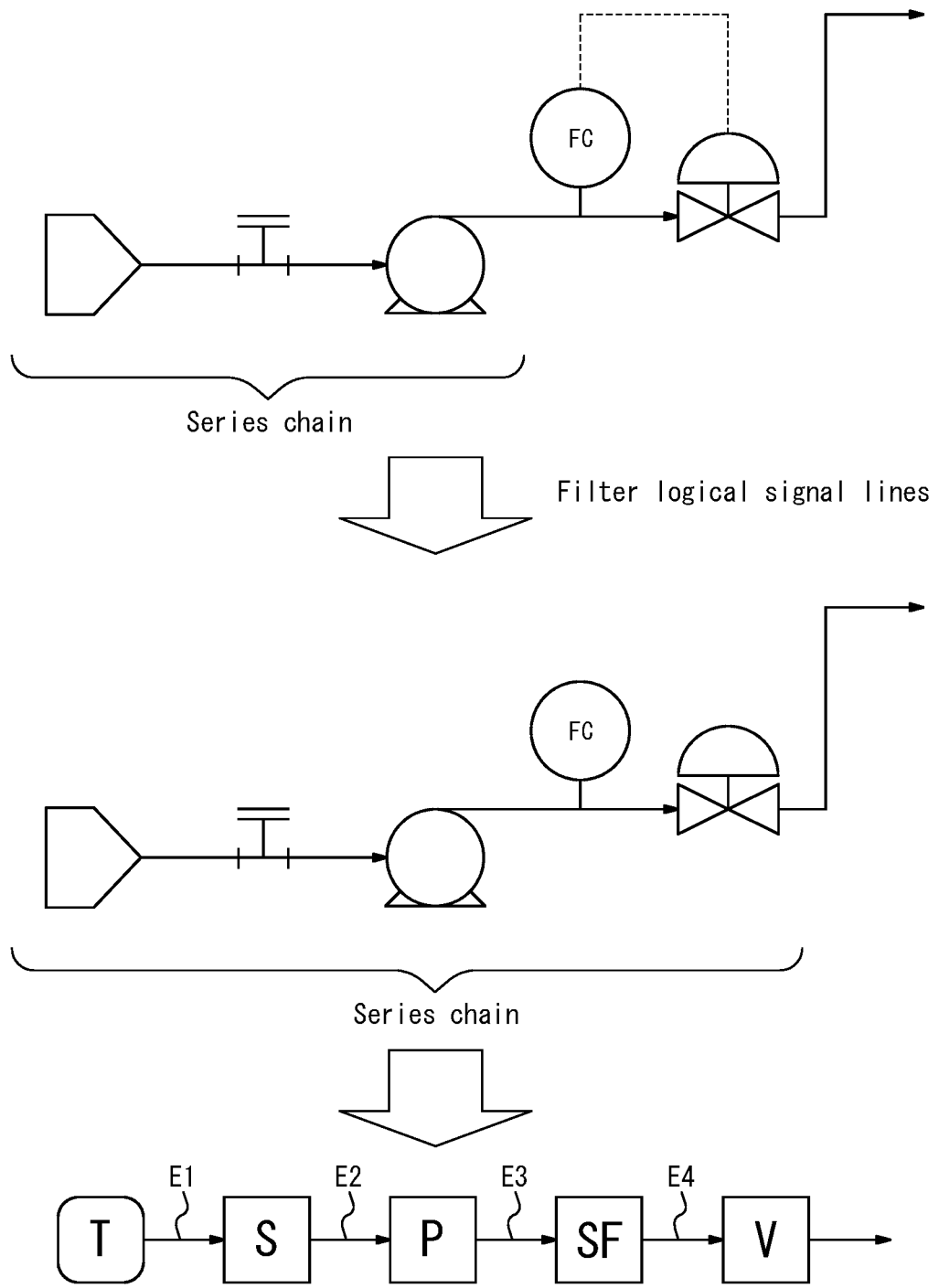
FIG. 7 is a schematic diagram for illustrating a modification related to control, executed by an element extraction unit of the controller, to extract a series chain in the first example of operation.

FIG. 7 is a schematic diagram for illustrating a modification related to control, executed by the element extraction unit 153 of the controller 15, to extract a series chain in the first example of operation.

For example, logical signal lines for control may be illustrated in drawings such as a P&ID, as indicated by the dashed lines in FIGS. 3A and 3B. These logical signal lines are often electrical wiring, but the connection method may be wireless instead of wired. For the purpose of comparing and confirming piping equipment and the like in a plant, the element extraction unit 153 of the controller 15 may filter out these logical signal lines when extracting the connection elements in series.

After the element extraction unit 153 of the controller 15 filters out the logical signal lines and extracts a series chain, the resulting post-change elements for the input portion in FIG. 3B, for example, are an input terminal, a strainer, a pump, a flow controller, and a control valve arranged in series, as illustrated in FIG. 7. The element extraction unit 153 of the controller 15 extracts such a series chain including the input terminal, the strainer, the pump, the flow controller, and the control valve from FIG. 3B. The conversion unit 155 of the controller 15 converts such an extracted series chain into a first abstract model in which an end node T based on the input terminal, a terminal pair node S based on the strainer, a terminal pair node P based on the pump, a terminal pair node SF based on the flow controller, and a terminal pair node V based on the control valve are connected by corresponding edges E1, E2, E3, E4. The conversion unit 155 may perform necessary processing or replacement at the time of conversion in accordance with notation rules for the drawings and the model. For this reason, "flow control (FC)" may become "flow sensor (SF)", and "TC" may become "ST", in the drawings from FIG. 7 onward. The information processing apparatus 10 may save the notation rules for the drawings and the model in the memory 12 or the like for use. The conversion unit 155 of the controller 15 converts the first abstract model to a second abstract model. The display control unit 156 of the controller 15 causes at least one of the output interface 14 of the information processing apparatus 10 and the output interface 24 of the terminal apparatus 20 to display the converted second abstract model.

In the first example of operations, the drawings have been described as being converted by the conversion unit 155 of the controller 15 to a first abstract model for processing and then to a second abstract model for display, but this example is not limiting. The conversion unit 155 may directly convert the drawings to the second abstract model, skipping over the first abstract model. At this time, the comparison/judgment unit 154 may use the second abstract model instead of the first abstract model when performing the above-described process to judge the difference between one abstract model and another abstract model.

(Second Example of Operations)

Figure 8A:
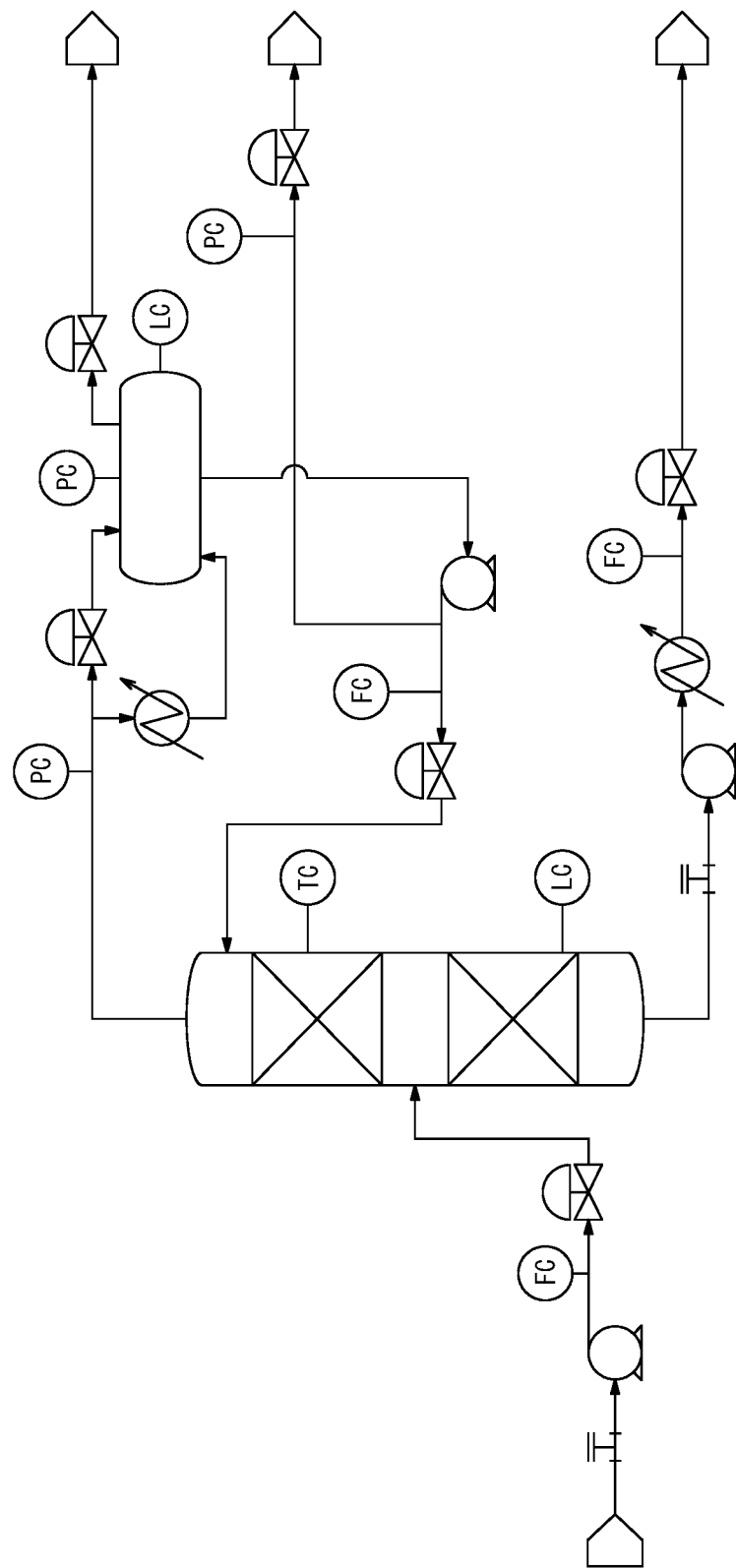
FIG. 8A is a schematic diagram, corresponding to FIG. 3B, illustrating an example of a post-change drawing that includes elements configuring a plant.
Figure 8B:
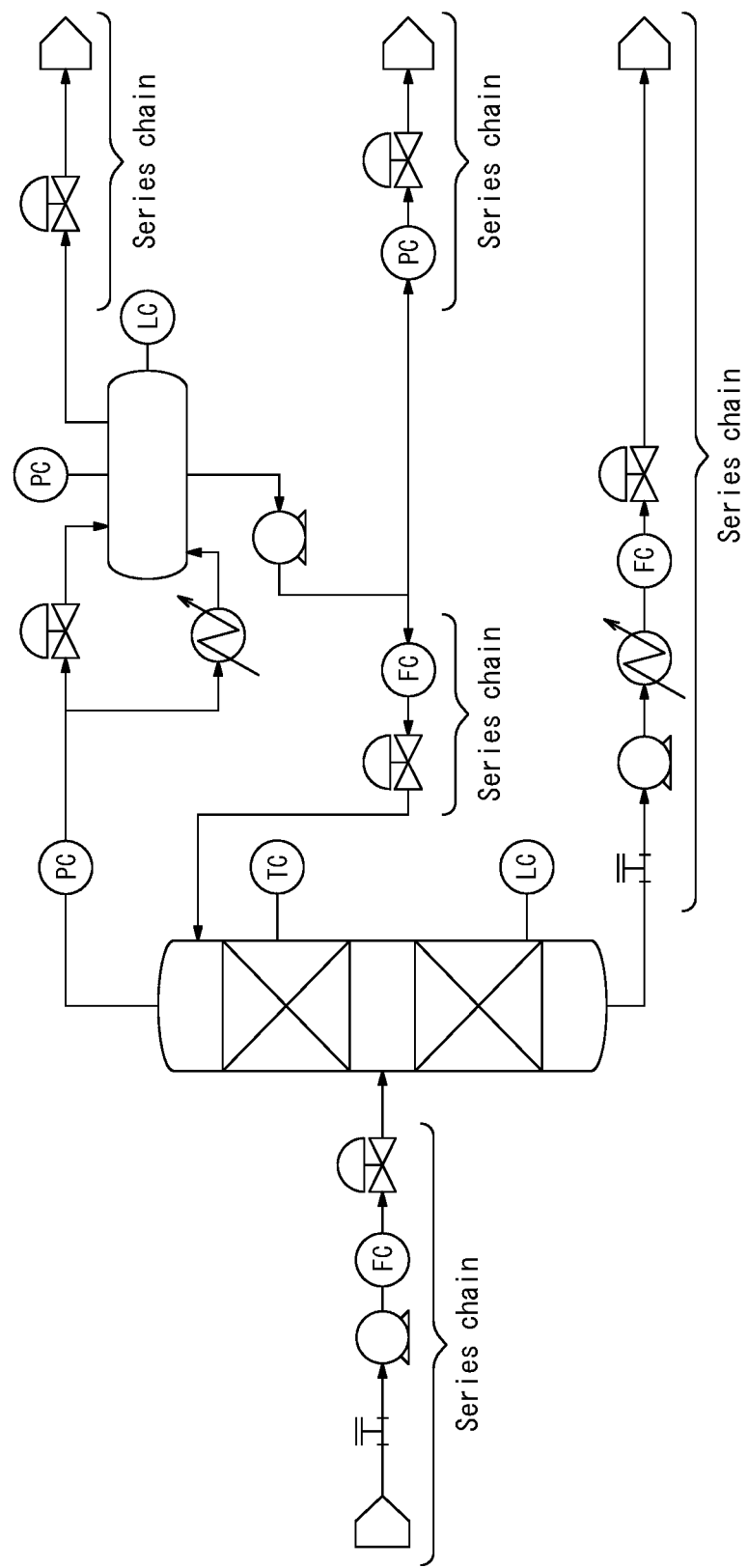
FIG. 8B is a schematic diagram, corresponding to FIG. 8A, in which the series chain of FIG. 8A is arranged for easier viewing.
Figure 8C:
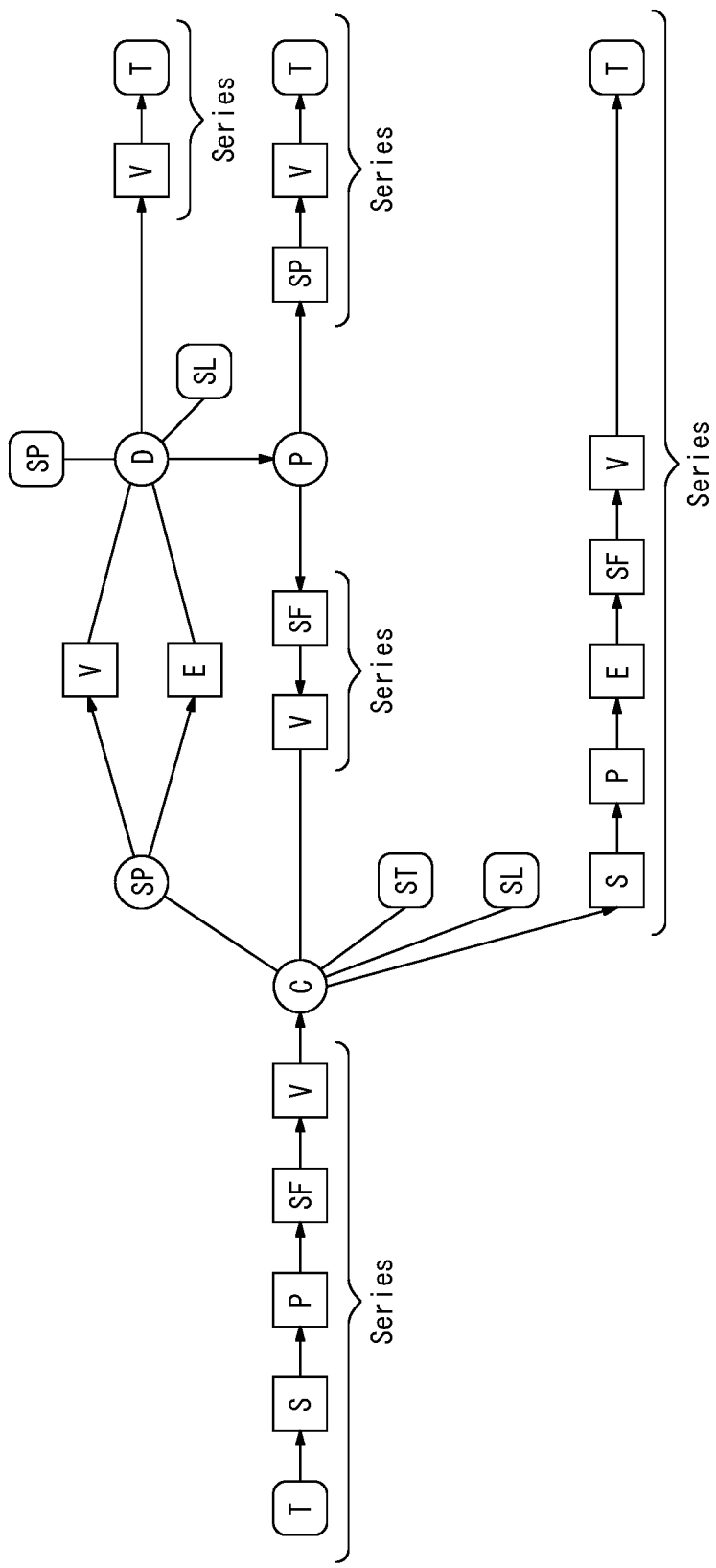
FIG. 8C is a schematic diagram illustrating a first abstract model generated by the element extraction unit of the controller based on FIG. 8B.
Figure 8D:
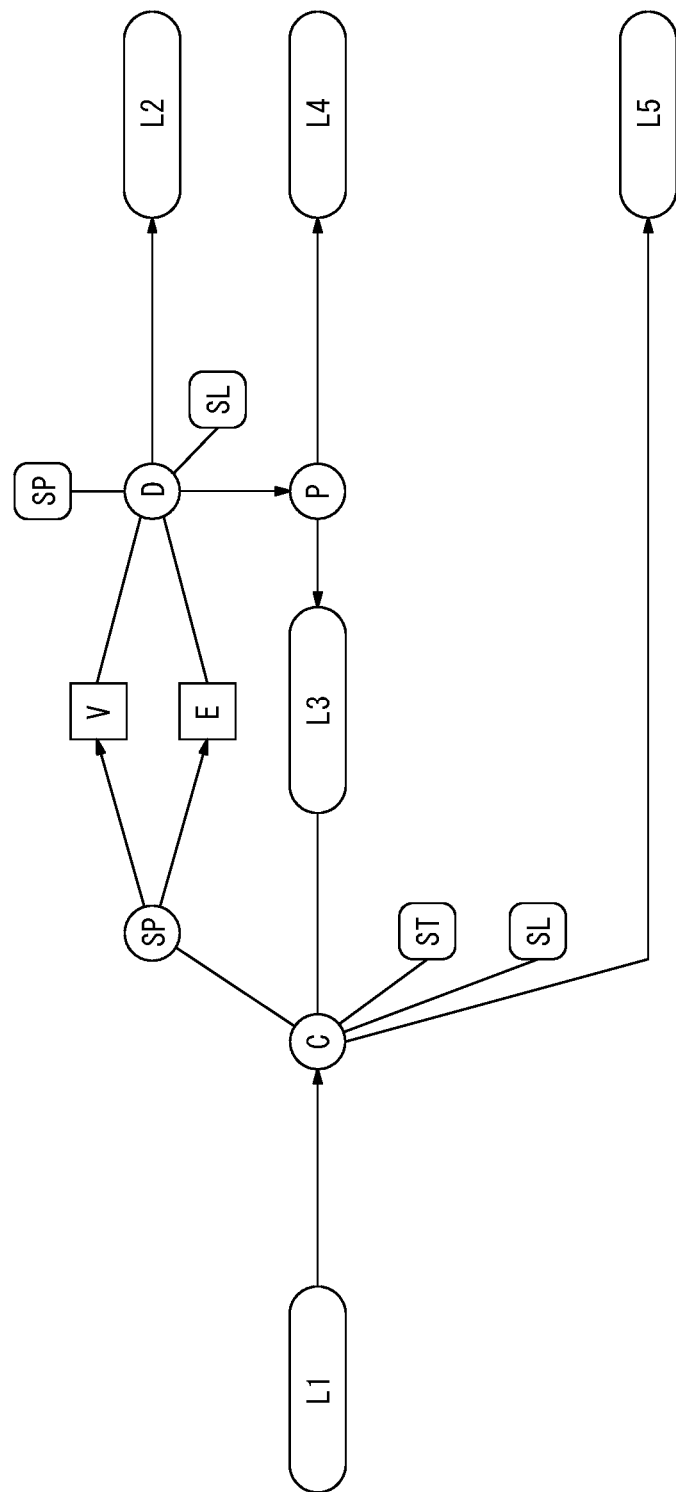
FIG. 8D is a schematic diagram illustrating a second abstract model yielded by further simplifying FIG. 8C.

A second example of operations of the information processing system 1 implemented by the functions of the controller 15 is mainly described below. FIG. 8A is a schematic diagram, corresponding to FIG. 3B, illustrating an example of a post-change drawing that includes elements configuring a plant. FIG. 8A differs from FIG. 3B in that logical signal lines for control, indicated by dashed lines in FIG. 3B, are removed by filtering. FIG. 8B is a schematic diagram, corresponding to FIG. 8A, in which the series chain of FIG. 8A is arranged for easier viewing. FIG. 8C is a schematic diagram illustrating a first abstract model generated by the conversion unit 155 of the controller 15 based on FIG. 8B. FIGS. 8B and 8C respectively illustrate a drawing and a first abstract model generated by the controller 15 at intermediary stages of the conversion processing from FIG. 8A to FIG. 8D and need not actually be displayed by the output interface 14 of the information processing apparatus 10 or the like. FIG. 8D is a schematic diagram illustrating a further simplification of the second abstract model in FIG. 8C.

In addition to extracting a series chain, as in the first example of operations, the element extraction unit 153 of the controller 15 in the second example of operations also extracts a group of elements included in a drawing and arranged in parallel from each drawing among the plurality of drawings for comparison. The element extraction unit 153 of the controller 15 converts elements included in the drawing and arranged in parallel to element information arranged in parallel in the first abstract model and the second abstract model.

For example, a series chain including an input terminal, a strainer, a pump, a flow controller, and a control valve as post-change elements is arranged at the input portion in FIG. 8B. A filling tower is connected to this series chain, and a plurality of elements are further connected to the filling tower in parallel. The element extraction unit 153 of the controller 15 extracts this series chain and the group of elements arranged in parallel from FIG. 8B. Based on the extracted series chain and group of elements arranged in parallel, the conversion unit 155 of the controller 15 generates a first abstract model such as the one illustrated in FIG. 8C.

In FIG. 8C, a branch node C is arranged following a plurality of nodes arranged in series, from the end node T to the terminal pair node V, corresponding to the series chain of the input portion in FIG. 8B. The branch node C has six edges, including the edge at the input side. In addition to the node group arranged in series from the end node T to the terminal pair node V, corresponding to the series chain of the input portion, four other similar node groups are arranged in series with respect to the series chain at the input portion in FIG. 8C. The controller 15 can represent a large-scale plant with thousands or tens of thousands of elements as a first abstract model that includes end nodes, node groups arranged in series, and branch nodes.

As illustrated in FIG. 8D, the display control unit 156 of the controller 15 modularizes (abbreviates) the plurality of node groups arranged in series in FIG. 8C and displays the node groups as lines L1, L2, L3, L4, L5. Since this model is an abstract model of series chains, the model may be configured as necessary for a detailed series chain to be displayed when the user clicks on an abbreviated portion. To confirm the model overall, for example, the user can collapse (i.e. hide from display) series chains to suppress information when unnecessary and expand series chains as necessary to confirm details of certain parts. The display control unit 156 of the controller 15 thus simplifies a plurality of node groups, arranged in series, by lines for more concise representation as a second abstract model based on end nodes, lines, and branch nodes.

Alternatively, the display control unit 156 may display "abbreviated" and "detailed" switching buttons along with the second abstract model displayed in FIG. 8D. The display control unit 156 may display the second abstract model in a form with the series chain sections abbreviated, as in FIG. 8D, when the abbreviated mode is selected. This is useful for the user to gain an overall idea of the second abstract model, for example. The display control unit 156 may display the second abstract model in a detailed display form with the abbreviated sections expanded, as in FIG. 8C, when the detailed mode is selected. At this time, the display control unit 156 may identify elements by using dashed lines to surround an element group in a series chain that can be abbreviated as a block while displaying other elements not in a series chain with different colors, for example.

Figure 9A:
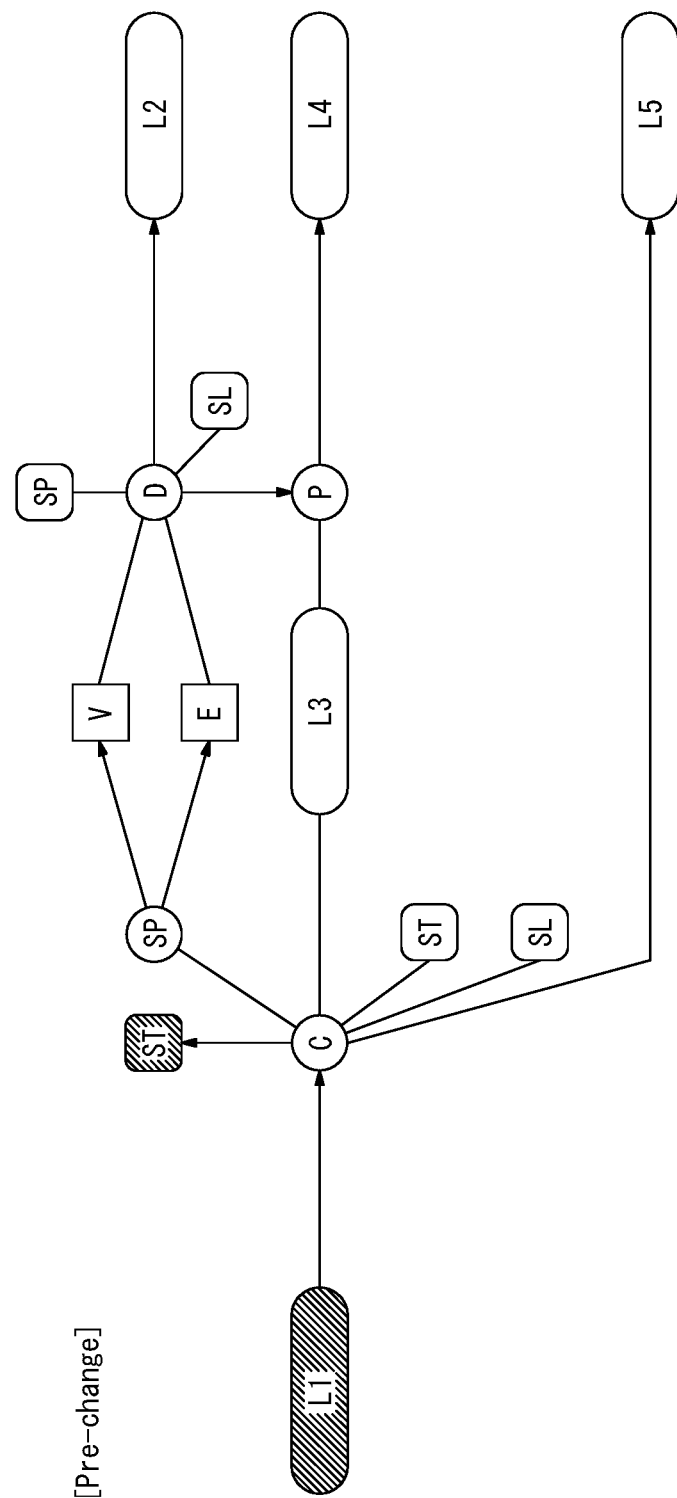
FIG. 9A is a schematic diagram illustrating an example of a second abstract model yielded by conversion of the drawing in FIG. 3A.
Figure 9B:
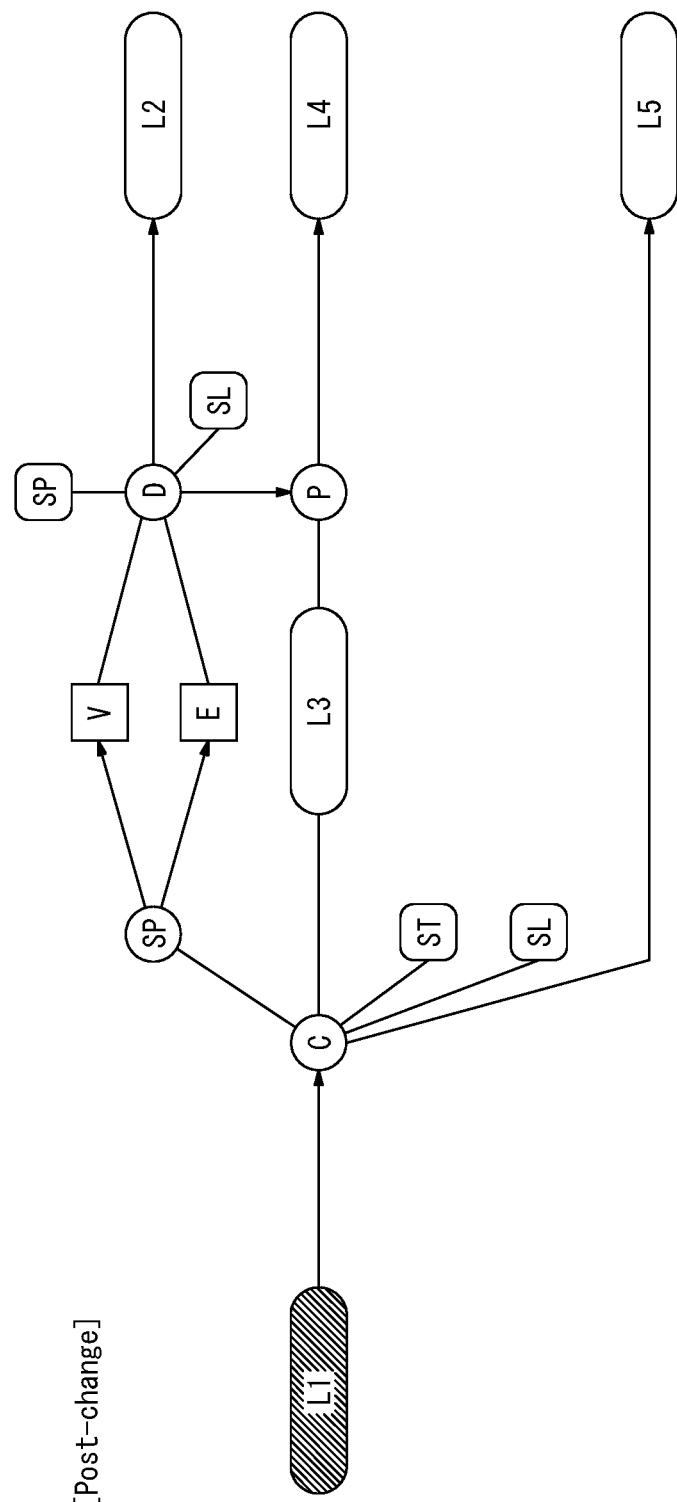
FIG. 9B is a schematic diagram illustrating an example of a second abstract model yielded by conversion of the drawing in FIG. 3B.
Figure 9D:
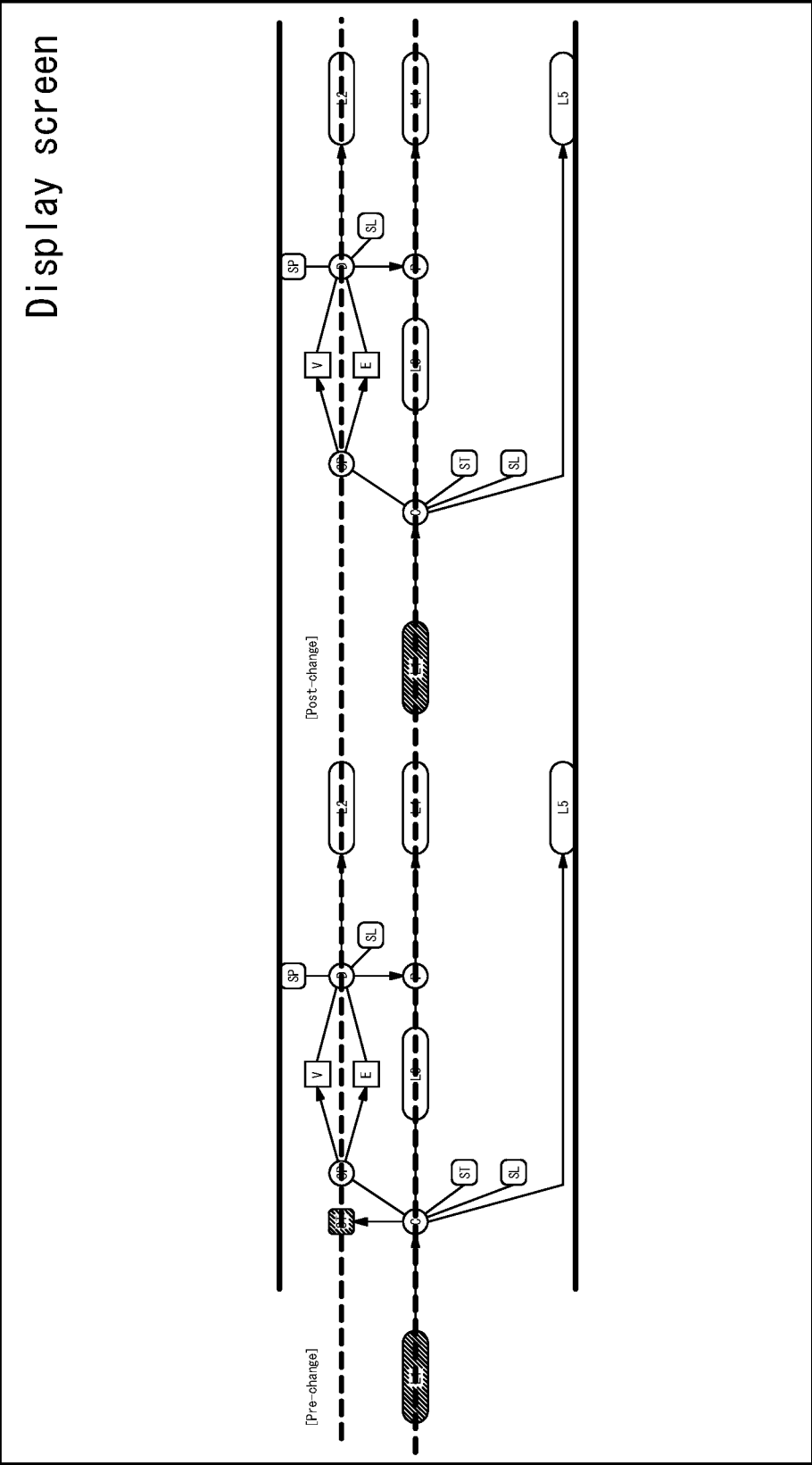
FIG. 9D is a schematic diagram in which the second abstract models of FIG. 9A and FIG. 9B are arrayed horizontally.

FIG. 9A is a schematic diagram illustrating an example of a second abstract model yielded by conversion of the drawing in FIG. 3A. FIG. 9B is a schematic diagram illustrating an example of a second abstract model yielded by conversion of the drawing in FIG. 3B. FIG. 9C is a schematic diagram in which the second abstract models of FIGS. 9A and 9B are arrayed vertically. FIG. 9D is a schematic diagram in which the second abstract models of FIGS. 9A and 9B are arrayed horizontally. The display control unit 156 of the controller 15 displays the second abstract models illustrated in FIGS. 9A and 9B, which are the result of converting drawings for comparison which include groups of elements arranged in series and in parallel, in parallel for comparison as illustrated in FIGS. 9C and 9D. The illustrated guidelines including solid and dashed lines are optional. The arrangement, intervals, and the like of element information are unified in the abstract model. The arrangement relationships between pieces of element information are therefore matched when the ends, the centers, or the like of the pieces of element information are aligned, facilitating comparison and confirmation by the user.

Based on at least one of identification information and attribute information included in the nodes, the comparison/judgment unit 154 of the controller 15 determines that predetermined element information is identical between the one first abstract model and the other first abstract model. For example, the comparison/judgment unit 154 determines that the branch node C in the pre-change first abstract model is identical to the branch node C in the post-change first abstract model. For example, the comparison/judgment unit 154 determines that the branch node SP in the pre-change first abstract model is identical to the branch node SP in the post-change first abstract model.

The display control unit 156 of the controller 15 arranges pieces of element information (which may include a series chain combining a plurality of pieces of element information) determined by the comparison/judgment unit 154 to be identical between one first abstract model and another first abstract model so that the arrangement relationship is identical in each second abstract model, and so that the positions in one direction are identical in the second abstract model. For example, in the case of a vertical array as in FIG. 9C, each piece of element information is displayed so that the positions of the element information match in the direction of series arrangement. For example, in the case of a horizontal array as in FIG. 9D, each piece of element information is displayed so that the positions of the element information match in the parallel direction, i.e. the height direction. For example, as illustrated in FIGS. 9C and 9D, the display control unit 156 arranges the element information so that the arrangement relationships of the branch node C in the pre-change second abstract model and the arrangement relationships of the branch node C in the post-change second abstract model are identical. For example, the display control unit 156 arranges the element information so that the arrangement relationships of the branch node SP in the pre-change second abstract model and the arrangement relationships of the branch node SP in the post-change second abstract model are identical.

For example, the display control unit 156 displays corresponding element information and connection information for the same element between a plurality of second abstract models after matching the positions of the element information and connection information in the horizontal direction or the vertical direction. In greater detail, when displaying FIGS. 9A and 9B vertically in parallel, the display control unit 156 adjusts the horizontal positions of the element information for the horizontally arranged line L1, branch node C, line L3, branch node P, line L4, and the like to match, as illustrated in FIG. 9C. Similarly, when displaying FIGS. 9A and 9B horizontally in parallel, as illustrated in FIG. 9D, the display control unit 156 adjusts the vertical positions of the element information for the vertically arranged line L2, line L4, line L5, and the like to match, as illustrated in FIG. 9D. The display control unit 156 increases visibility for the user and facilitates comparison by thus displaying element information to match in shape and have corresponding vertical or horizontal positions.

The comparison/judgment unit 154 of the controller 15 judges that a difference exists between one first abstract model and another abstract model when the connection information associated with certain element information in the one first abstract model is different from the connection information associated with element information determined to be identical to the certain element information in the other first abstract model. For example, since the number of edges associated with the branch node C in the pre-change first abstract model differs from the number of edges associated with the branch node C in the post-change first abstract model, the comparison/judgment unit 154 judges that a difference exists between the pre-change first abstract model and the post-change first abstract model. At this time, the display control unit 156 of the controller 15 displays one second abstract model and another second abstract model in a state with different connection information.

When it is judged that a difference exists between the one first abstract model and the other first abstract model, the display control unit 156 of the controller 15 generates display information for displaying the differing portion in a different form than other portions. For example, the display control unit 156 generates highlight information for highlighting the pre-change end node ST, which is a differing portion removed by the change, with a different display color than other portions in the second abstract model. For example, the display control unit 156 generates highlight information based on the first example of operations for highlighting the pre- and post-change lines L1, which are a differing portion where a strainer is added by the change, with a different display color than other portions in the second abstract model. Based on the generated display information, the display control unit 156 causes at least one of the output interface 14 of the information processing apparatus 10 and the output interface 24 of the terminal apparatus 20 to display a comparison between the pre- and post-change second abstract models including the differing portion.

Figure 10:
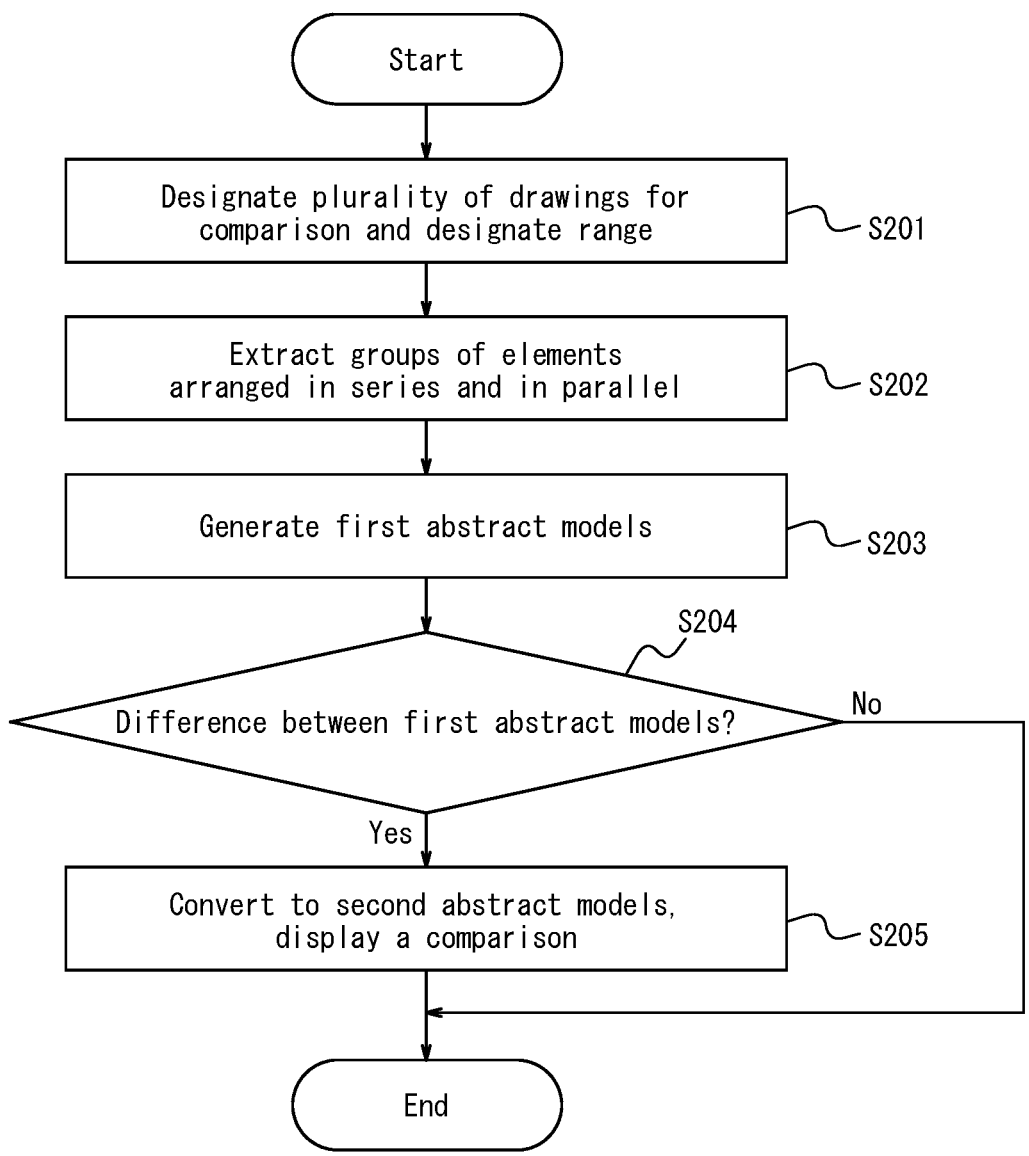
FIG. 10 is a flowchart based on a second example of operations.

FIG. 10 is a flowchart based on the second example of operations. With reference to FIG. 10, an example of operations by the information processing apparatus 10 based on the second example of operations is mainly described.

In step S201, the drawing designation unit 151 of the controller 15 designates a plurality of drawings for comparison. The drawing designation unit 151 may further designate a range for comparison in the designated drawings.

In step S202, the element extraction unit 153 of the controller 15 extracts element groups arranged in series chains and in parallel from the drawings designated in step S201.

In step S203, the conversion unit 155 of the controller 15 generates first abstract models based on the element groups arranged in series chains and in parallel extracted in step S202.

The processing by the element extraction unit 153 in step S202 and the processing by the conversion unit 155 in step S203 are not limited to the above order. For example, the controller 15 may execute the processing of step S202 after first executing the processing of step S203.

In step S204, the comparison/judgment unit 154 of the controller 15 compares the first abstract models generated in step S203 for the plurality of drawings for comparison and makes judgments such as whether a difference exists between the first abstract models. In greater detail, the comparison/judgment unit 154 judges whether the connection information associated with certain element information in one first abstract model is different from the connection information associated with element information determined to be identical to the certain element information in another first abstract model. When it is judged that a difference exists between the first abstract models, the controller 15 executes the processing of step S205. When it is judged that no difference exists between the first abstract models, the controller 15 ends the processing.

When it is judged that a difference exists between the first abstract models in step S204, the conversion unit 155 of the controller 15 converts the first abstract models generated in step S203 to second abstract models in step S205. Similarly, the display control unit 156 of the controller 15 causes at least one of the output interface 14 of the information processing apparatus 10 and the output interface 24 of the terminal apparatus 20 to display the one second abstract model and the other second abstract model. At this time, the display control unit 156 of the controller 15 modularizes (abbreviates) a plurality of node groups arranged in series to reduce the amount of information for more concise representation as a second abstract model based on end nodes, lines, and branch nodes. Additionally, the display control unit 156 generates display information for displaying the differing portion in a different form than other portions.

The display control unit 156 of the controller 15 causes at least one of the output interface 14 of the information processing apparatus 10 and the output interface 24 of the terminal apparatus 20 to display the converted second abstract models while reflecting, as necessary, the display information generated in step S205. In this way, the display control unit 156 displays the second abstract models and encourages confirmation by the user only when a difference exists between the first abstract models for comparison. This example is not limiting. When no difference exists between the first abstract models for comparison, the display control unit 156 may display the second abstract models as they are to convey to the user that the drawings (or portions thereof) match. For example, when no difference exists, the display control unit 156 may provide a display using character information, the second abstract model, and the like to convey that the drawings for comparison match.

The various modifications described above in the first example of operations similarly apply to the second example of operations.

(Third Example of Operations)

A third example of operations of the information processing system 1 implemented by the functions of the controller 15 is mainly described below. For example, when drawings with different formats are compared, the types of elements of the plant to be illustrated in each drawing and the information level vary greatly. It is therefore not easy to compare these drawings mechanically. To address this, the controller 15 matches the information level of a first drawing and a second drawing for comparison in the third example of operations.

For example, the memory 12 stores information on drawing rules, such as those listed in Table 1 below, determined for each drawing format. The controller 15 refers as necessary to the information on the drawing rules stored in the memory 12. These drawing rules may include common rules generally used in the technical field related to the plant and unique rules determined freely by the user.

TABLE 1

|  | Main instrumentation | Other instrumentation | Control valve | Manual valve | Pipe |
|---|---|---|---|---|---|
| PFD | O | X | O | X | X |
| P&ID | O | O | O | O | O |
| 3D piping diagram | O | O | O | O | O |

When the drawing format differs, the types of plant elements that need to be depicted in the drawing differ. In terms of information level, the level increases in the order of PFD, P&ID, and 3D piping diagram, for example. The information level of a PFD is lowest, for example, and some elements depicted in a P&ID may not even be depicted (may be unnecessary) in a PFD drawing.

For example, suppose that a manual valve is added to a P&ID drawing. This is an element not depicted in a PFD to begin with. Accordingly, if the controller 15 includes the manual valve of a P&ID drawing in the comparison between a PFD drawing and the P&ID drawing, the controller 15 mistakenly detects the manual valve as a differing portion, i.e. an element to be added to the PFD. It is thus useless for the controller 15 to detect elements unnecessary in a PFD one by one and present the elements to the user. For example, the user is forced to make superfluous decisions, which could lead to confusion. The controller 15 therefore compares the first drawing and the second drawing after matching the information level between the first drawing and the second drawing for comparison as necessary, for example by removing, in advance, information not contained in the PFD to begin with, such as manual valves.

For example, the drawing format judgment unit 152 of the controller 15 judges whether the first drawing and the second drawing including elements configuring the plant have different formats. When it is judged that the first drawing and the second drawing have different formats, the element extraction unit 153 of the controller 15 removes the elements unnecessary for comparison among the elements included in the first drawing, for example. The conversion unit 155 of the controller 15 then generates an intermediate model for the first drawing by matching the format of the first drawing to the format of the second drawing. In other words, based on the first drawing for comparison designated by the drawing designation unit 151, the element extraction unit 153 extracts elements necessary for matching the format of the drawing to the format of the second drawing and extracts elements to remove. The conversion unit 155 then generates an intermediate model as a first abstract model based only on the necessary elements.

At this time, when the elements to be depicted in the first drawing as determined based on the first format include elements unnecessary in the second drawing as determined based on the second format, the conversion unit 155 removes the elements unnecessary in the second drawing from the first drawing to match the constituent element level of the drawings and generate an intermediate model (a first abstract model with a unified level) for the first drawing to enable a comparison under unified conditions.

In greater detail, the conversion unit 155 converts each of the first drawing and the second drawing to a first abstract model represented by element information and connection information and generates one first abstract model based on the first drawing as the intermediate model with information level matching applied thereto. For example, when converting the first drawing to the first abstract model, the conversion unit 155 performs the conversion while excluding unnecessary elements to generate a first abstract model (intermediate model) with unified conditions. If the first abstract model of the first drawing and the second abstract model of the second drawing are compared without any processing being performed, then the first abstract model includes elements not needing to be depicted in the second drawing, making an appropriate comparison difficult. The element extraction unit 153 therefore excludes elements not needing to be depicted in the second drawing from the first drawing, and the conversion unit 155 generates the first abstract model with unified conditions for the first drawing, matching the level of the constituent elements.

Figure 11A:
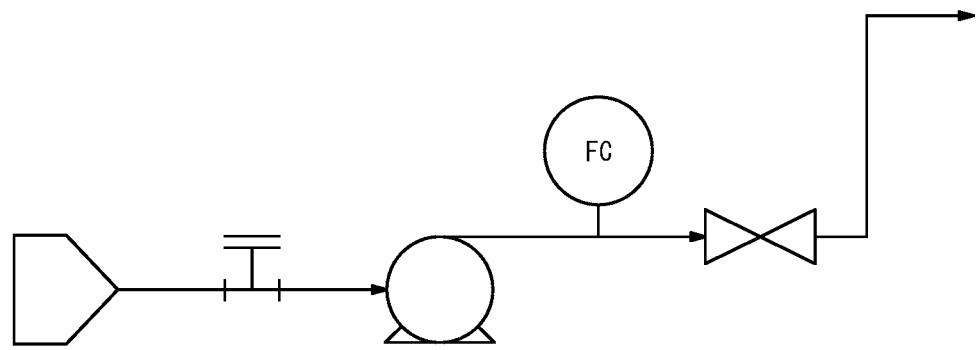
FIG. 11A is a schematic drawing illustrating an example of a first drawing based on a first format.
Figure 11B:
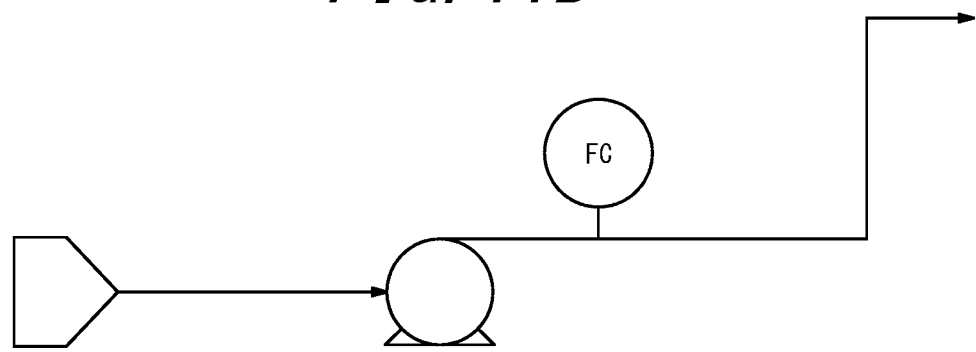
FIG. 11B is a schematic drawing illustrating an example of a second drawing based on a second format.
Figure 11C:
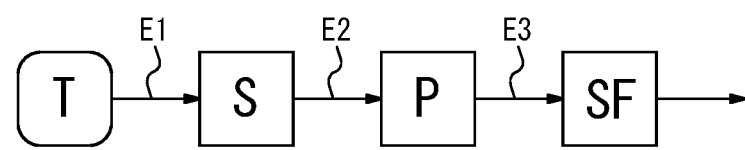
FIG. 11C is a schematic drawing illustrating an example of an intermediate model generated by the controller for the first drawing of FIG. 11A.

FIG. 11A is a schematic drawing illustrating an example of a first drawing based on a first format. FIG. 11B is a schematic drawing illustrating an example of a second drawing based on a second format. FIG. 11C is a schematic drawing illustrating an example of an intermediate model generated by the controller 15 for the first drawing of FIG. 11A.

When the first format is P&ID, for example, a manual valve is illustrated as an element configuring the plant in the first drawing, as illustrated in FIG. 11A. Additionally, in the first drawing, a strainer has been added to the input portion as an element configuring the plant.

When the second format is PFD, for example, a manual valve is not illustrated in the second drawing, as illustrated in FIG. 11B, even when the manual valve is actually incorporated in the plant as an element configuring the plant. Additionally, the strainer is not incorporated in the input portion as an element configuring the plant and is not illustrated in the second drawing.

At this time, when the drawing format judgment unit 152 of the controller 15 judges that the first drawing and the second drawing have different formats, the element extraction unit 153 and the conversion unit 155 of the controller 15 generate an intermediate model by matching the P&ID to the PFD and extracting elements based on the first drawing. In greater detail, the controller 15 removes the manual valve, which is not common to the P&ID and the PFD, from the first drawing and extracts only the common elements from the first drawing to generate an intermediate model, such as the one illustrated in FIG. 11C, as the first abstract model.

For example, the element extraction unit 153 and the conversion unit 155 convert the first drawing to an intermediate model as a first abstract model in which an end node T based on an input terminal, a terminal pair node S based on a strainer, a terminal pair node P based on a pump, and a terminal pair node SF based on a flow controller are connected by corresponding edges E1, E2, E3.

Based on the intermediate model generated for the first drawing for comparison, the comparison/judgment unit 154 of the controller 15 judges whether a difference exists between the first drawing and the second drawing. In this way, the comparison/judgment unit 154 of the controller 15 judges the difference by comparing the first drawing and the second drawing in a state such that element-related conditions are matched between the first drawing and the second drawing.

For example, the comparison/judgment unit 154 compares the intermediate model, such as the one in FIG. 11C, generated for the first drawing with another first abstract model, such as the one illustrated in FIG. 11B, based on the second drawing. At this time, the comparison/judgment unit 154 judges that a difference exists between the first drawing and the second drawing, since a strainer has been added to the input portion of the intermediate model generated for the first drawing, whereas the strainer has not been added to the input portion of the other first abstract model based on the second drawing. In this way, the information processing apparatus 10 excludes the manual valve from the comparison and can thereby detect only the strainer, which is the difference that should be detected.

FIG. 12 is a flowchart based on the third example of operations. With reference to FIG. 12, an example of operations by the information processing apparatus 10 based on the third example of operations is mainly described.

In step S301, the drawing designation unit 151 of the controller 15 designates a first drawing and a second drawing for comparison. The drawing designation unit 151 may further designate a range for comparison in the designated drawings.

In step S302, the drawing format judgment unit 152 of the controller 15 judges whether the first drawing and the second drawing including elements configuring the plant have different formats. The controller 15 executes the processing of step S303 upon judging that the first drawing and the second drawing have different formats. The controller 15 executes the processing of step S304 upon judging that the first drawing and the second drawing have the same format.

When the first drawing and the second drawing are judged to have different formats in step S302, the element extraction unit 153 of the controller 15 excludes unnecessary elements and extracts necessary elements from the first drawing in step S303 to generate an intermediate model, for the first drawing, that matches the format of the first drawing to the format of the second drawing, for example.

In step S304, the controller 15 executes the aforementioned processing described in the first example of operations or the second example of operations. In greater detail, the controller 15 executes the processing from step S102 to step S105 of FIG. 6 or from step S202 to step S205 of FIG. 10.

For example, in step S304, the comparison/judgment unit 154 of the controller 15 judges whether a difference exists between (i) the intermediate model generated in step S304 based on the processing of step S303 as the first abstract model based on the first drawing and (ii) the other first abstract model based on the second drawing. The comparison/judgment unit 154 thereby judges whether a difference exists between the first drawing and the second drawing. When it is judged that a difference exists between one first abstract model (intermediate model) and another first abstract model, the controller 15 generates display information for displaying the differing portion in a different form than other portions. The corresponding explanation in the first example of operations or the second example of operations applies to the processing in step S304.

In the third example of operations, a drawing has been described as being converted by the conversion unit 155 of the controller 15 to an intermediate model as a first abstract model for processing and then to a second abstract model for display, but this example is not limiting. The conversion unit 155 may directly convert the drawing to an intermediate model as a second abstract model, skipping over the first abstract model. At this time, the comparison/judgment unit 154 may use the second abstract model instead of the first abstract model when performing the above-described process to judge the difference between the first drawing and second drawing.

In the third example of operations, the element extraction unit 153 and the conversion unit 155 of the controller 15 have been described as generating an abstract model based on a drawing as an intermediate model, but this example is not limiting. The controller 15 may generate a drawing as an intermediate model by removing unnecessary elements and extracting only necessary elements from a drawing. For example, the element extraction unit 153 and the conversion unit 155 may generate a drawing as an intermediate model by removing the manual valve, which is not common to a P&ID and a PFD, from the first drawing illustrated in FIG. 11A. At this time, the comparison/judgment unit 154 may use the drawings, yielded by conversion of the first drawing, as an intermediate model to judge whether a difference exists between the first drawing and the second drawing.

(Effects)

According to the information processing apparatus 10 of the above embodiment, the efficiency of work by a user who uses drawings for a plant improves. For example, when it is judged that a difference exists between one abstract model based on one drawing and another abstract model based on another drawing, the controller 15 generates display information for displaying the differing portion in a different form than other portions. The user can thereby compare the content of a plurality of drawings visually and confirm the differing portion and the like quickly and accurately in the abstract model displayed as display information on at least one of the output interface 14 of the information processing apparatus 10 and the output interface 24 of the terminal apparatus 20.

A plurality of drawings for comparison can be compared and the comparison result can be confirmed easily by the controller 15 converting elements included in a drawing and arranged in series to a first abstract model and a second abstract model of series chains. Since the display of the second abstract model is extremely concise, the user can easily confirm the existence of errors, omissions, changes, and the like. Work efficiency therefore increases, work hours decrease, and accuracy also improves. Accordingly, omissions and mistakes in confirmation by the user are reduced. The work by a user who handles a large volume of drawings for the same equipment can thereby be performed accurately in a short time, and the occurrence of work errors and fatal defects in the plant can be suppressed during design, construction, and maintenance of a large-scale plant.

The array of element information is better ordered by the controller 15 arranging pieces of element information so that the positions of corresponding elements in the second abstract models are aligned. The second abstract model is thereby more visible for the user.

The user can see at a glance which pieces of element information are identical by the controller 15 arranging pieces of element information determined to be identical between one first abstract model and another first abstract model so that the pieces of element information are on the same grid line. The efficiency and accuracy of work by the user therefore improve.

When corresponding element information is missing in one of the one first abstract model and the other first abstract model, the user can easily confirm the differing portion between one second abstract model and another second abstract model by the information processing apparatus 10 displaying the one second abstract model and the other second abstract model in a state without the facing element information.

A comparison can easily be made between groups of elements arranged in parallel between a plurality of drawings for comparison, and the comparison results can easily be confirmed, by the controller 15 converting parallel elements included in a drawing to element information arranged in parallel in the first abstract model and the second abstract model. Since the display of the second abstract model based on such groups of elements is concise, the user can easily confirm changes. Consequently, work efficiency increases, and omissions and mistakes in confirmation by the user are reduced. The work by a user who handles a large volume of drawings for the same equipment can thereby be performed accurately in a short time, and the occurrence of work errors and fatal defects in the plant can be suppressed during design, construction, and maintenance of a large-scale plant.

The display of the second abstract model that includes groups of elements arranged in parallel becomes even more concise by the controller 15 causing node groups arranged in series to be modularized and displayed as lines. The efficiency and accuracy of work by the user therefore improve.

The user can see at a glance which pieces of element information are identical by the controller 15 arranging pieces of element information determined to be identical between one first abstract model and another first abstract model so that the arrangement relationship is identical in each second abstract model, and so that the positions in one direction are identical in the second abstract model. The efficiency and accuracy of work by the user therefore improve.

The user can easily recognize that the connection information differs between one second abstract model and another second abstract model by the controller 15 causing the one second abstract model and the other second abstract model to be displayed in a state with differing connection information. For example, to compare second abstract models, it suffices for the user to focus on the change in the number of branches of each branch node, the change in the number of lines and end nodes, and the like. Omissions and the like by the user are therefore reduced, while efficiency and accuracy of work by the user improve.

The information processing apparatus 10 can easily identify identical pieces of element information by the controller 15 determining that pieces of element information are identical based on the identification information. By the controller 15 determining that pieces of element information are identical based on the attribute information in addition to or instead of the identification information, the information processing apparatus 10 can identify identical pieces of element information more accurately even when it cannot be determined whether pieces of element information are identical based only on the identification information.

When the display information includes highlight information for highlighting the differing portion based on at least one of a display color, a display format, a display line type, an additional display symbol, and an additional display character, the user can compare the content of a plurality of drawings visually and confirm the differing portion and the like quickly and accurately in the second abstract model displayed together with the highlight information. The efficiency and accuracy of work by the user therefore improve.

According to the information processing apparatus 10 of the above embodiment, the efficiency of work by a user who uses drawings for a plant improves. For example, the controller 15 generates an intermediate model, for at least one of the first drawing and the second drawing, such that the format of the first drawing and the format of the second drawing are matched and then judges whether a difference exists between the first drawing and the second drawing based on the generated intermediate model. The information processing apparatus 10 can thereby use the intermediate model configured only by elements common to the first drawing and the second drawing to compare the first drawing and the second drawing in a state such that the information levels are matched. Accordingly, the accuracy of comparison by the information processing apparatus 10 increases. Additionally, by at least one of the output interface 14 of the information processing apparatus 10 and the output interface 24 of the terminal apparatus 20 displaying the intermediate model with the information levels matched as the second abstract model, the user can accurately compare the content of a plurality of drawings visually and confirm the differing portion or the like even for a first drawing and a second drawing that have different drawing formats. The efficiency and accuracy of work by the user therefore improve.

The controller 15 generates the intermediate model for the first drawing by extracting only elements common to the first drawing and the second drawing from the first drawing. The information processing apparatus 10 can thereby compare the drawings after matching the information level of the first drawing based on the first format and the information level of the second drawing based on the second format. For example, the information processing apparatus 10 can compare a PFD drawing with a P&ID drawing, which includes elements unnecessary in the PFD for comparison, by matching the P&ID drawing to the PFD drawing, i.e. matching the levels of the drawings.

(Modifications)

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the components, steps, and the like may be reordered in any logically consistent way. Furthermore, components, steps, and the like may be combined into one or divided.

For example, the present disclosure may also be embodied as a program containing a description of the processing for achieving the functions of the above-described information processing system 1 or a storage medium with the program recorded thereon. Such embodiments are also to be understood as falling within the scope of the present disclosure.

In the above embodiment, the drawings before and after a change made to equipment of a plant have mainly been described as the target of comparison, but this example is not limiting. The drawings for comparison may include any drawings created by different users in the same time period for the same equipment of the plant.

In the above embodiment, the conversion unit 155 of the controller 15 has been described as generating an intermediate model only for the first drawing, but this example is not limiting. The conversion unit 155 may generate the intermediate model that matches the format of the first drawing and the format of the second drawing to each other for at least one of the drawings. For example, the controller 15 may extract only the elements common to the first format and the second format from each of the first drawing and the second drawing to generate an intermediate model as a first abstract model for each of the first drawing and the second drawing. The comparison/judgment unit 154 may then compare a first intermediate model generated for the first drawing and a second intermediate model generated for the second drawing.

At least a portion of the processing operations executed by the information processing apparatus 10 in the above embodiment may be executed by the terminal apparatus 20, for example. At least a portion of the processing operations executed by the terminal apparatus 20 may be executed by the information processing apparatus 10.

The invention claimed is:

1. An information processing apparatus for supporting work by a user who uses drawings for a plant, the information processing apparatus comprising:
a controller configured to
abstract a drawing including elements configuring the plant and convert the drawing into an abstract model represented by element information indicating the elements and connection information indicating a connection relationship between the elements;
generate display information, when it is judged that a difference exists between one abstract model based on a pre-change drawing and another abstract model based on a post-change drawing, for displaying the difference; and
based on the generated display information, cause at least one of an output interface of the information processing apparatus and an output interface of the user's terminal apparatus to display the another abstract model with highlighting a differing portion from the one abstract model.

2. The information processing apparatus of claim 1, wherein
the abstract model includes a first abstract model for processing by the controller and a second abstract model, yielded by conversion of the first abstract model, for display to the user, and
the controller is configured to convert elements arranged in series among the elements included in the drawing into element information arranged in series in the first abstract model and in the second abstract model.

3. The information processing apparatus of claim 2, wherein the controller is configured to arrange pieces of the element information determined to be identical between one first abstract model and another first abstract model so that positions of the pieces of the element information in an array direction are identical in the second abstract model.

4. The information processing apparatus of claim 3, wherein the controller is configured to arrange the pieces of the element information determined to be identical between the one first abstract model and the another first abstract model so that the pieces of the element information are facing along one grid line among a plurality of grid lines separated in the array direction at predetermined intervals in the second abstract model.

5. The information processing apparatus of claim 4, wherein when corresponding element information is missing in one of the one first abstract model and the another first abstract model, the controller is configured to display one second abstract model and another second abstract model in a state without the facing element information.

6. The information processing apparatus of claim 2, wherein the controller is configured to convert elements arranged in parallel among the elements included in the drawing into element information arranged in parallel in the first abstract model and in the second abstract model.

7. The information processing apparatus of claim 6, wherein the controller is configured to arrange pieces of the element information determined to be identical between one first abstract model and another first abstract model so that an arrangement relationship is identical in each second abstract model, and positions of the pieces of the element information in one direction are identical in the second abstract model.

8. The information processing apparatus of claim 6, wherein when the connection information associated with certain element information in one first abstract model is different from the connection information associated with element information determined to be identical to the certain element information in another first abstract model, the controller is configured to display one second abstract model and another second abstract model in a state such that the connection information differs.

9. The information processing apparatus of claim 2, wherein
the element information includes identification information for identifying the elements and attribute information of the elements; and
the controller is configured to determine that pieces of the element information are identical between one first abstract model and another first abstract model based on at least one of the identification information and the attribute information.

10. The information processing apparatus of claim 1, wherein the display information includes highlight information for highlighting the differing portion based on at least one of a display color, a display format, a display line type, an additional display symbol, and an additional display character.

11. The information processing apparatus of claim 1, wherein the both abstract models are respectively based on pre- and post-change drawings.

12. An information processing method for execution by an information processing apparatus that supports work by a user who uses drawings for a plant, the information processing method comprising:
abstracting a drawing including elements configuring the plant and converting the drawing into an abstract model represented by element information indicating the elements and connection information indicating a connection relationship between the elements;
judging whether a difference exists between one abstract model based on a pre-change drawing and another abstract model based on a post-change drawing;
generating display information, when it is judged that the difference exists between the one abstract model and the another abstract model, for displaying the difference; and
based on the generated display information, causing at least one of an output interface of the information processing apparatus and an output interface of the user's terminal apparatus to display the another abstract model with highlighting a differing portion from the one abstract model.

13. The information processing method of claim 12, wherein the both abstract models are respectively based on pre- and post-change drawings.

14. A non-transitory computer readable medium storing a program executable by one or more processors to cause an information processing apparatus, which supports work by a user who uses drawings for a plant, to execute functions comprising:
abstracting a drawing including elements configuring the plant and converting the drawing into an abstract model represented by element information indicating the elements and connection information indicating a connection relationship between the elements;
judging whether a difference exists between one abstract model based on a pre-change drawing and another abstract model based on a post-change drawing;
generating display information, when it is judged that the difference exists between the one abstract model and the another abstract model, for displaying the difference; and
based on the generated display information, causing at least one of an output interface of the information processing apparatus and an output interface of the user's terminal apparatus to display the another abstract model with highlighting a differing portion from the one abstract model.

15. The non-transitory computer readable medium of claim 14, wherein the both abstract models are respectively based on pre- and post-change drawings.

* * * * *